US010373381B2

(12) United States Patent
Nuernberger et al.

(10) Patent No.: US 10,373,381 B2
(45) Date of Patent: Aug. 6, 2019

(54) VIRTUAL OBJECT MANIPULATION WITHIN PHYSICAL ENVIRONMENT

(71) Applicant: Microsoft Technology Licensing, LLC, Redmond, WA (US)

(72) Inventors: Benjamin Nuernberger, Goleta, CA (US); Hrvoje Benko, Seattle, WA (US); Andrew Wilson, Seattle, WA (US); Eyal Ofek, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/085,905

(22) Filed: Mar. 30, 2016

(65) Prior Publication Data

US 2017/0287218 A1 Oct. 5, 2017

(51) Int. Cl.
*G06T 19/20* (2011.01)
*G06T 19/00* (2011.01)
*G06F 3/01* (2006.01)
*G06F 3/0484* (2013.01)

(52) U.S. Cl.
CPC ............ *G06T 19/006* (2013.01); *G06F 3/011* (2013.01); *G06F 3/04845* (2013.01); *G06T 19/20* (2013.01); *G06T 2200/04* (2013.01); *G06T 2219/2004* (2013.01); *G06T 2219/2016* (2013.01)

(58) Field of Classification Search
CPC ............................... G06T 19/006; G06T 19/00
USPC ......................................................... 345/633
See application file for complete search history.

(56) References Cited

U.S. PATENT DOCUMENTS 3,069,654 A 12/1962 Hough
6,280,323 B1 8/2001 Yamazaki et al.
6,448,964 B1 9/2002 Isaacs et al.
(Continued)

FOREIGN PATENT DOCUMENTS

EP 2378488 A2 10/2011

OTHER PUBLICATIONS

Feiner, S. et al., "Knowledge-Based Augmented Reality," Communications of the ACM—Special issue on computer augmented environments: back to the real world, vol. 36, No. 7, Jul. 1993, 10 pages.
(Continued)

*Primary Examiner* — Jin Ge
(74) *Attorney, Agent, or Firm* — Alleman Hall Creasman & Tuttle LLP

(57) ABSTRACT

A method, computing device and head-mounted display device for manipulating a virtual object displayed via a display device are disclosed. In one example, image data of a physical environment comprising physical features is received. A three dimensional model of at least a portion of the environment is generated. Candidate anchor features that each correspond to one of the physical features are extracted from the image data. User input is received that manipulates the virtual object as displayed within the environment. Based on the manipulation, a correspondence between a virtual anchor feature of the virtual object and a corresponding candidate anchor feature is identified. An indication of the corresponding candidate anchor feature at its corresponding physical feature within the environment is displayed to the user.

17 Claims, 14 Drawing Sheets

(56) References Cited

U.S. PATENT DOCUMENTS

| | | | |
|---|---|---|---|
| 6,573,903 B2 | 6/2003 | Gantt | |
| 6,741,241 B1 | 5/2004 | Jaubert et al. | |
| 7,050,078 B2 | 5/2006 | Dempski | |
| 7,301,547 B2 | 11/2007 | Martins et al. | |
| 7,831,089 B2 | 11/2010 | Ofek et al. | |
| 7,889,195 B2 | 2/2011 | Shih et al. | |
| 8,072,470 B2 | 12/2011 | Marks | |
| 8,223,145 B2 | 7/2012 | Chakraborty | |
| 2006/0038833 A1 | 2/2006 | Mallinson et al. | |
| 2008/0301547 A1 | 12/2008 | Karunakaran et al. | |
| 2009/0066690 A1* | 3/2009 | Harrison | G06T 19/006 345/419 |
| 2010/0245352 A1* | 9/2010 | Chakraborty | G06T 19/20 345/421 |
| 2010/0289817 A1 | 11/2010 | Meier et al. | |
| 2011/0098056 A1 | 4/2011 | Rhoads et al. | |
| 2011/0102424 A1 | 5/2011 | Hibbert et al. | |
| 2011/0316845 A1 | 12/2011 | Roberts et al. | |
| 2012/0086729 A1* | 4/2012 | Baseley | G06F 3/011 345/633 |
| 2012/0113223 A1 | 5/2012 | Hilliges et al. | |
| 2012/0210254 A1* | 8/2012 | Fukuchi | G06F 3/012 715/757 |
| 2012/0242798 A1 | 9/2012 | McArdle et al. | |
| 2012/0249741 A1* | 10/2012 | MacIocci | G06F 3/011 348/46 |
| 2012/0256954 A1 | 10/2012 | Soon-Shiong | |
| 2012/0306853 A1 | 12/2012 | Wright et al. | |
| 2012/0307075 A1 | 12/2012 | Margalit | |
| 2013/0044128 A1* | 2/2013 | Liu | G09G 5/00 345/633 |
| 2014/0225898 A1* | 8/2014 | Fyke | G06T 11/00 345/473 |
| 2014/0225922 A1 | 8/2014 | Sbardella | |
| 2014/0267228 A1* | 9/2014 | Ofek | G06T 19/006 345/419 |
| 2014/0306993 A1* | 10/2014 | Poulos | G06T 19/006 345/633 |
| 2014/0333666 A1 | 11/2014 | Poulos et al. | |
| 2015/0123966 A1 | 5/2015 | Newman | |
| 2015/0317832 A1* | 11/2015 | Ebstyne | G06F 3/011 345/633 |
| 2015/0356774 A1* | 12/2015 | Gal | G06F 17/50 345/633 |
| 2016/0246384 A1* | 8/2016 | Mullins | G06F 3/017 |

OTHER PUBLICATIONS

Breen, D. et al., "Interactive Occlusion and Automatic Object Placement for Augmented Reality," Computer Graphics Forum, vol. 15, No. 3, Aug. 1996, 12 pages.

Kautz, H. et al., "Blackbox: A New Approach to the Application of Theorem Proving to Problem Solving," In Working notes of AIPS-98 Workshop on Planning as Combinatorial Search, Jun. 7, 1998, Pittsburgh, Pennsylvania, 3 pages.

Smith, G. et al., "3D Scene Manipulation with 2D Devices and Constraints," Proceedings of Graphics Interface 2001 ,(GI '01), Jun. 7, 2001, Ottawa, Ontario, 9 pages.

Xu, K. et al., "Constraint-based Automatic Placement for Scene Composition," Proceedings of Graphics Interface 2002 (GI '02), May 27, 2002, Calgary, Alberta, 10 pages.

Hecker, C. et al., "Real-time Motion Retargeting to Highly Varied User-Created Morphologies," Proceedings of ACM SIGGRAPH 2008 (SIGGRAPH '08), vol. 27, No. 3, Article No. 27, Aug. 11, 2008, Los Angeles, California, 11 pages.

Klein, G. et al., "Parallel Tracking and Mapping on a Camera Phone," 8th IEEE International Symposium on Mixed and Augmented Reality (ISMAR 2009), Oct. 19, 2009, Orlando, Florida, 4 pages.

Burke, J. et al., "Augmented Reality Games for Upper-Limb Stroke Rehabilitation," 2010 Second International Conference on Games and Virtual Worlds for Serious Applications (VS-Games), Mar. 25, 2010, Braga, Portugal, 4 pages.

Talton, J. et al., "Metropolis Procedural Modeling," ACM Transactions on Graphics (TOG), vol. 30, No. 2, Article No. 11, Apr. 2011, 14 pages.

Yu, L. et al., "Make it Home: Automatic Optimization of Furniture Arrangement," Proceedings of ACM SIGGRAPH 2011 (SIGGRAPH '11), vol. 30, No. 4, Article No. 86, Jul. 2011, Vancouver, British Columbia, 11 pages.

Merrell, P. et al., "Interactive Furniture Layout Using Interior Design Guidelines," Proceedings of ACM SIGGRAPH 2011 (SIGGRAPH '11), vol. 30, No. 4, Article No. 87, Jul. 2011, Vancouver, British Columbia, 9 pages.

"Nintendo 3DS Official Site—AR Cards," Nintendo Website, Available Online at www.nintendo.com/3ds/ar-cards, Available as Early as Sep. 24, 2011, Retrieved Jan. 2, 2013, 2 pages.

Izadi, S. et al., "KinectFusion: Real-time 3D Reconstruction and Interaction Using a Moving Depth Camera," Proceedings of the 24th Annual ACM Symposium on User Interface Software and Technology (UIST '11), Oct. 16, 2011, Santa Barbara, California, 10 pages.

Dube, D. et al., "Real-Time Plane Extraction from Depth Images with the Randomized Hough Transform," 2011 IEEE nternational Conference on Computer Vision Workshops (ICCV Workshops), Nov. 6, 2011, Barcelona, Spain, 8 pages.

Nóbrega, et al., "Magnetic Augmented Reality: Virtual Objects in Your Space", In Proceedings of the International Working Conference on Advanced Visual Interfaces, May 21, 2012, pp. 332-335.

Baudisch, et al., "Snap-and-Go: Helping Users Align Objects without the Modality of Traditional Snapping", In 3roceedings of SIGCHI Conference on Human Factors in Computing Systems, Apr. 2, 2005, pp. 301-310.

Bell, et al., "View Management for Virtual and Augmented Reality", In Proceedings of 14th Annual ACM Symposium on User Interface Software and Technology, Nov. 11, 2001, pp. 101-110.

Bier, et al., "Snap-Dragging", In Journal of ACM SIGGRAPH Computer Graphics, vol. 20, Issue 4, Aug. 18, 1986, pp. 233-240.

Bier, Eric Allan, "Snap-Dragging in Three Dimensions", In Proceedings of Symposium on Interactive 3D Graphics, Mar. 1990, pp. 193-204.

Borrmann, et al., "The 3D Hough Transform for Plane Detection in Point Clouds: A Review and a New Accumulator Design", In Journal of 3D Research, vol. 2, Issue 2, Mar. 2011, pp. 1-13.

Canny, John, "A Computational Approach to Edge Detection", In Journal of IEEE Transactions on Pattern Analysis and Machine Intelligence, vol. 8, Issue 6, Nov. 1986, pp. 679-698.

Duda, et al., "Use of the Hough Transformation to Detect Lines and Curves in Pictures", In Journal of Communications of the ACM, vol. 15, No. 1, Jan. 1972, pp. 11-15.

Fernandes, et al., "Real-Time Line Detection through an Improved Hough Transform Voting Scheme", In Journal of Pattern Recognition, vol. 41, Issue 1, Jan. 2008, pp. 299-314.

Fernquist, et al., ""Oh Snap"—Helping Users Align Digital Objects on Touch Interfaces", In Proceedings of 13th IFIP TC International Conference on Human-Computer Interaction, Sep. 5, 2011, pp. 1-18.

FischleR, et al., "Random Sample Consensus: A Paradigm for Model Fitting with Applications to Image Analysis and Automated Cartography", In Journal of Communications of the ACM Magazine, vol. 24, Issue 6, Jun. 1981, pp. 381-395.

Forster, et al., "An Architecture Based on Constraints for Augmented Shared Workspaces", In Proceedings of XIV Brazilian Symposium on Computer Graphics and Image Processing, Oct. 2001, pp. 328-335.

Frisch, et al., "Neat: A Set of Flexible Tools and Gestures for Layout Tasks on Interactive Displays", In Proceedings of ACM International Conference on Interactive Tabletops and Surfaces, Nov. 13, 2011, pp. 1-10.

Gal, et al., "Flare: Fast Layout for Augmented Reality Applications", In Proceedings of IEEE International Symposium on Mixed and Augmented Reality, Sep. 10, 2014, 6 pages.

(56) References Cited

OTHER PUBLICATIONS

Gelfand, et al., "Shape Segmentation Using Local Slippage Analysis", In Proceedings of Eurographics/ACM SIGGRAPH Symposium on Geometry Processing, Jul. 8, 2004, pp. 214-223.

Gleicher, Michael, "Image Snapping", In Proceedings of 22nd Annual Conference on Computer Graphics and Interactive Techniques, Aug. 6, 1995, pp. 183-190.

Heo, et al., "Design of a Shape Dependent Snapping Algorithm", In Proceedings of the Extended Abstracts on Human Factors in Computing Systems, May 5, 2012, pp. 2207-2212.

Klasing, et al., "Comparison of Surface Normal Estimation Methods for Range Sensing Applications", In Proceedings of IEEE International Conference on Robotics and Automation, May 12, 2009, pp. 3206-3211.

Lee, et al. "Snap-to-Feature Interface for Annotation in Mobile Augmented Reality ", In Proceedings of the 9th IEEE International Symposium on Mixed and Augmented Reality , Oct. 13, 2010, 4 pages.

Lee, et al., "Assistive Techniques for Precise Touch Interaction in Handheld Augmented Reality Environments", In Proceedings of the 11th ACM SIGGRAPH International Conference on Virtual-Reality Continuum and its Applications in Industry, Dec. 2, 2012, pp. 279-285.

Merrell, et al., "Interactive Furniture Layout Using Interior Design Guidelines", In Proceeding of Special Interest Group on Computer Graphics and Interactive Techniques Conference, Aug. 7, 2011, 9 pages.

Newcombe, et al., "DynamicFusion: Reconstruction and Tracking of Non-rigid Scenes in Real-Time", In Proceedings of the IEEE Conference on Computer Vision and Pattern Recognition, Jun. 7, 2015, 10 pages.

Newcombe, et al., "KinectFusion: Real-Time Dense Surface Mapping and Tracking", In Proceedings of IEEE International Symposium on Mixed and Augmented Reality, Oct. 26, 2011, 10 pages.

Silberman, et al., "A Contour Completion Model for Augmenting Surface Reconstructions", In Proceedings of European Conference on Computer Vision, Sep. 6, 2014, pp. 1-15.

Choi, et al., "RGB-D Edge Detection and Edge-Based Registration", In Proceedings of IEEE/RSJ International Conference on Intelligent Robots and Systems, Nov. 3, 2013, pp. 1568-1575.

Xu, et al., "Constraint-based Automatic Placement for Scene Composition", In Proceedings of Graphics Interface, May 27, 2002, 10 pages.

Xu, et al., "GACA: Group-Aware Command-based Arrangement of Graphic Elements", In Proceedings of the 33rd Annual ACM Conference on Human Factors in Computing Systems, Apr. 8, 2015, pp. 2787-2795.

"Sketchup", Retrieved on: Jan. 7, 2016 Available at: http://www.sketchup.com/learn.

Mortensen, et al., "Interactive Segmentation with Intelligent Scissors", In Journal of Graphical Models and Image Processing, vol. 60, Issue 5, Sep. 1998, 48 pages.

Barde, Snehlata., "Innovation of new world; Integration of virtual object in real world", In International Journal of Application or Innovation in Engineering & Management, vol. 2, Issue 3, Mar. 2013, pp. 85-89.

ISA European Patent Office, International Search Report and Written Opinion Issued in PCT Application No. PCT/US2017/024214, dated Jul. 4, 2017, WIPO, 12 Pages.

Kitamura, Y. et al., "Consolidated Manipulation of Virtual and Real Objects," In Proceedings of the ACM Symposium on Virtual Reality Software and Technology, Sep. 15, 1997, Lausanne, Switzerland, 6 pages.

\* cited by examiner

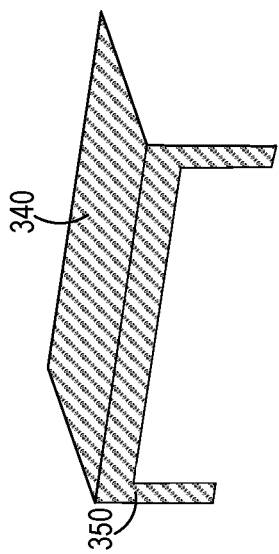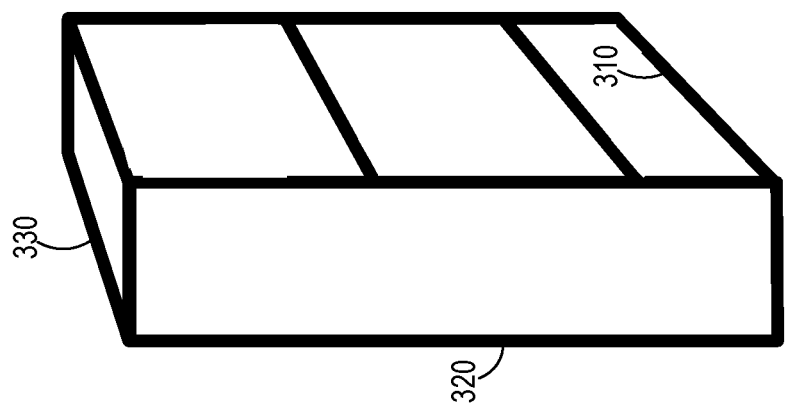
FIG. 3

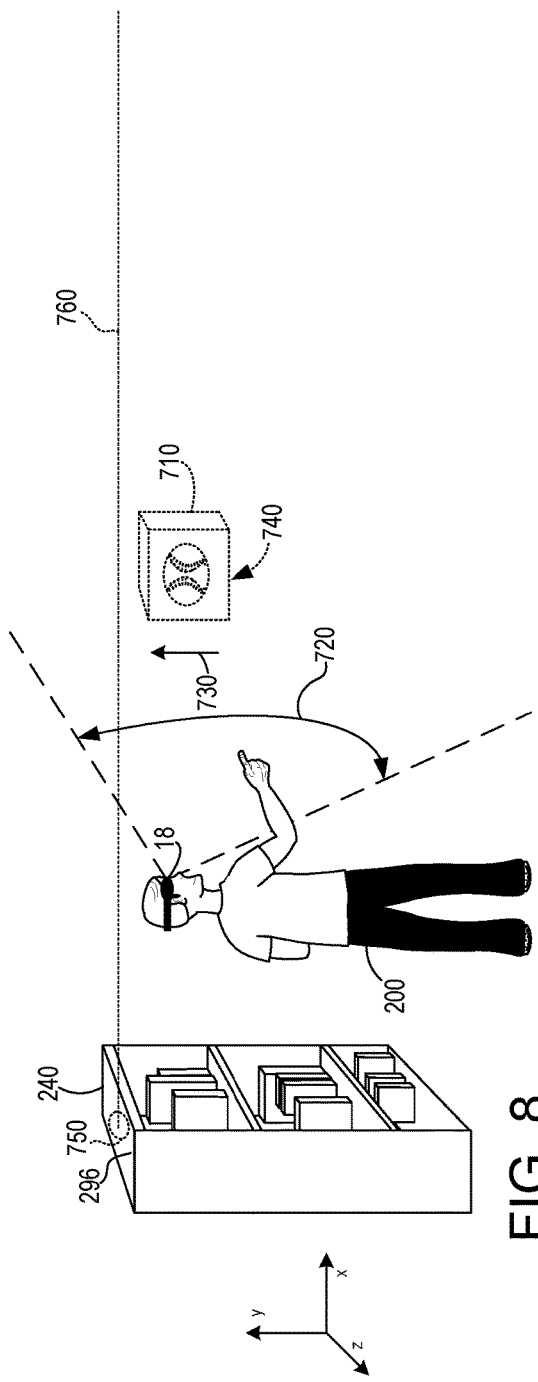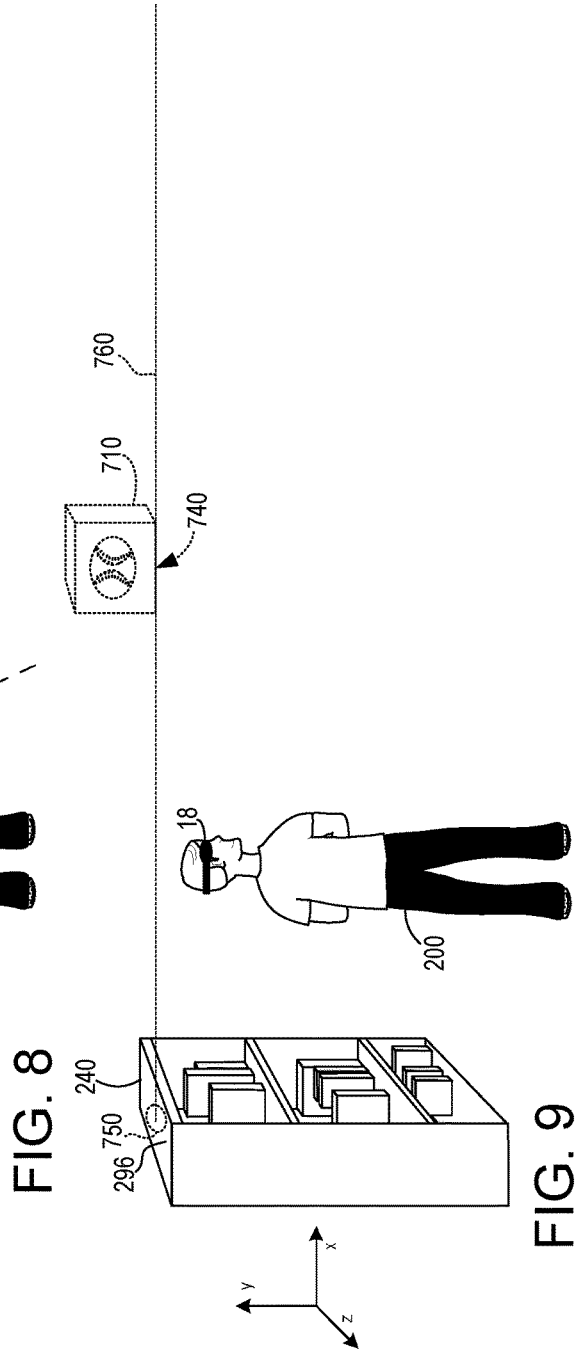

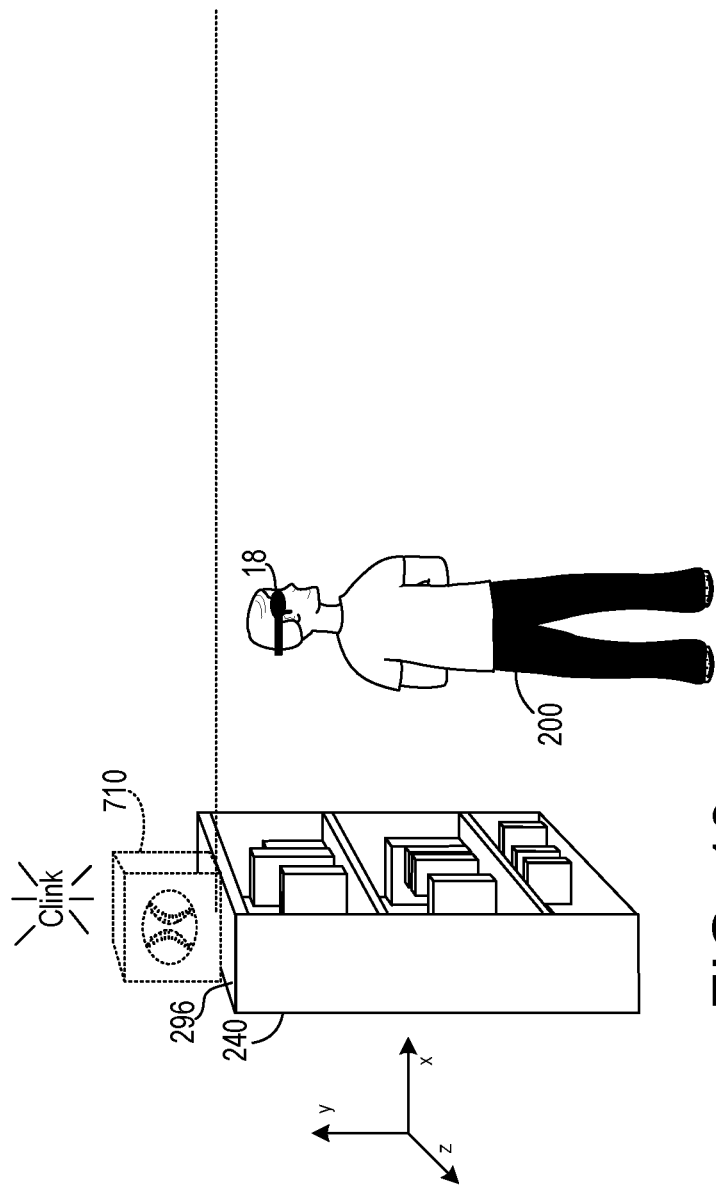

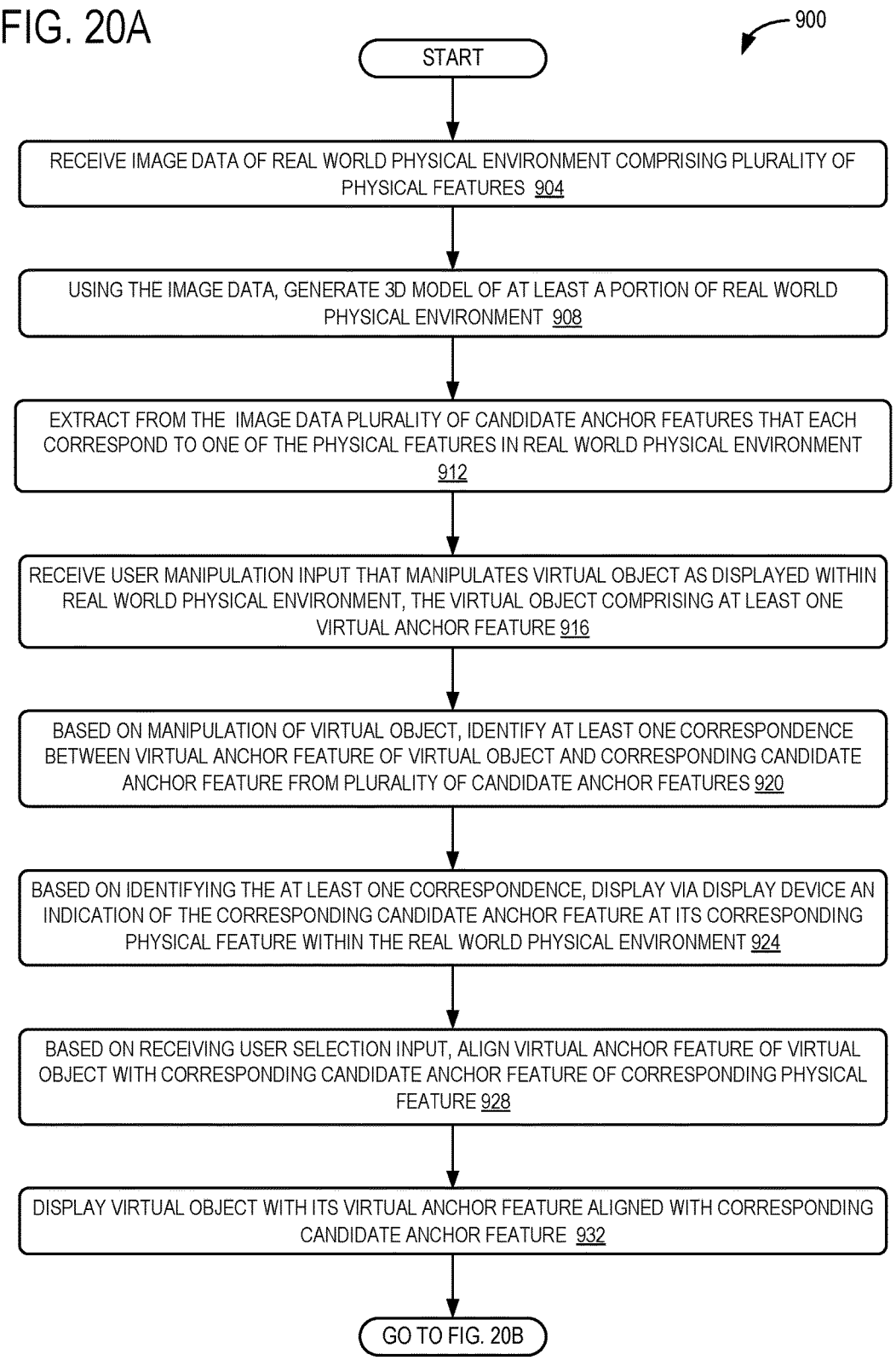

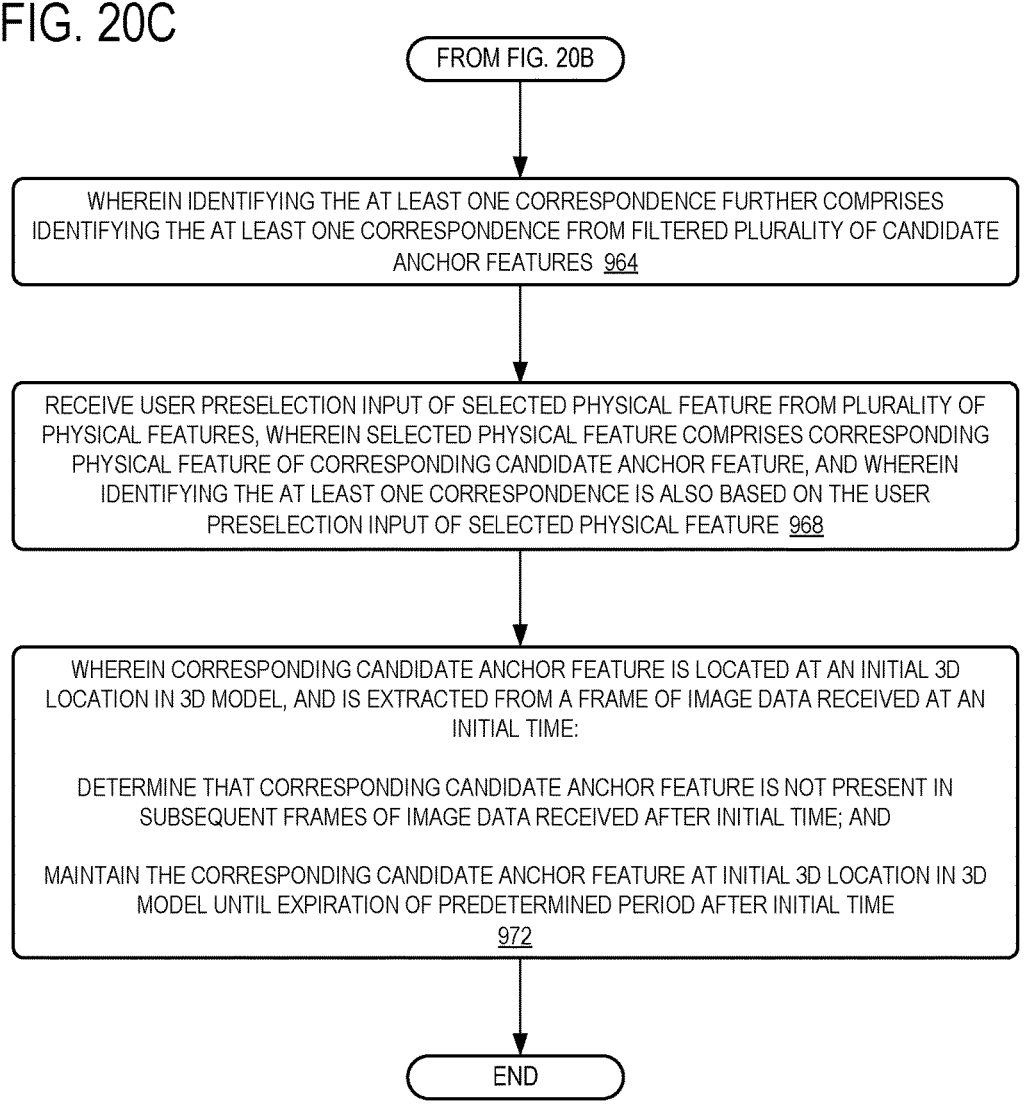

VIRTUAL OBJECT MANIPULATION WITHIN PHYSICAL ENVIRONMENT

BACKGROUND

Augmented reality display devices enable users to view, create and manipulate virtual content that is displayed to appear within the users' physical environment. In some examples, a user may desire to locate and orient a virtual object or portion thereof with respect to a physical object or surface in the user's physical environment. Enabling a user to easily manipulate a virtual object to a desired location and orientation relative to a physical object or surface can prove challenging.

SUMMARY

Methods, computing devices and head-mounted display devices for manipulating a virtual object displayed within a real world physical environment are disclosed herein. In one example, a method comprises receiving image data of a real world physical environment comprising a plurality of physical features. Using the image data, a three dimensional model of at least a portion of the real world physical environment is generated. A plurality of candidate anchor features that each correspond to one of the physical features in the real world physical environment are extracted from the image data.

The method includes receiving user manipulation input that manipulates the virtual object as displayed within the real world physical environment, wherein the virtual object comprises a virtual anchor feature. Based on the manipulation of the virtual object, at least one correspondence between the virtual anchor feature of the virtual object and a corresponding candidate anchor feature from the plurality of candidate anchor features is identified. Based on identifying at least one correspondence, an indication of the corresponding candidate anchor feature at its corresponding physical feature within the real world physical environment is displayed via the display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows examples of candidate anchor features that correspond to physical features in the real world physical environment of FIG. 2 according to an example of the present disclosure.

FIGS. 8-10 show an indication of a corresponding candidate anchor feature extending into a field of view of the display device from a non-visible location, and a virtual object aligning with the corresponding physical according to an example of the present disclosure.

FIGS. 20A, 20B and 20C are a flow chart of a method for manipulating a virtual object displayed via a display device according to an example of the present disclosure.

DETAILED DESCRIPTION

Figure 1:
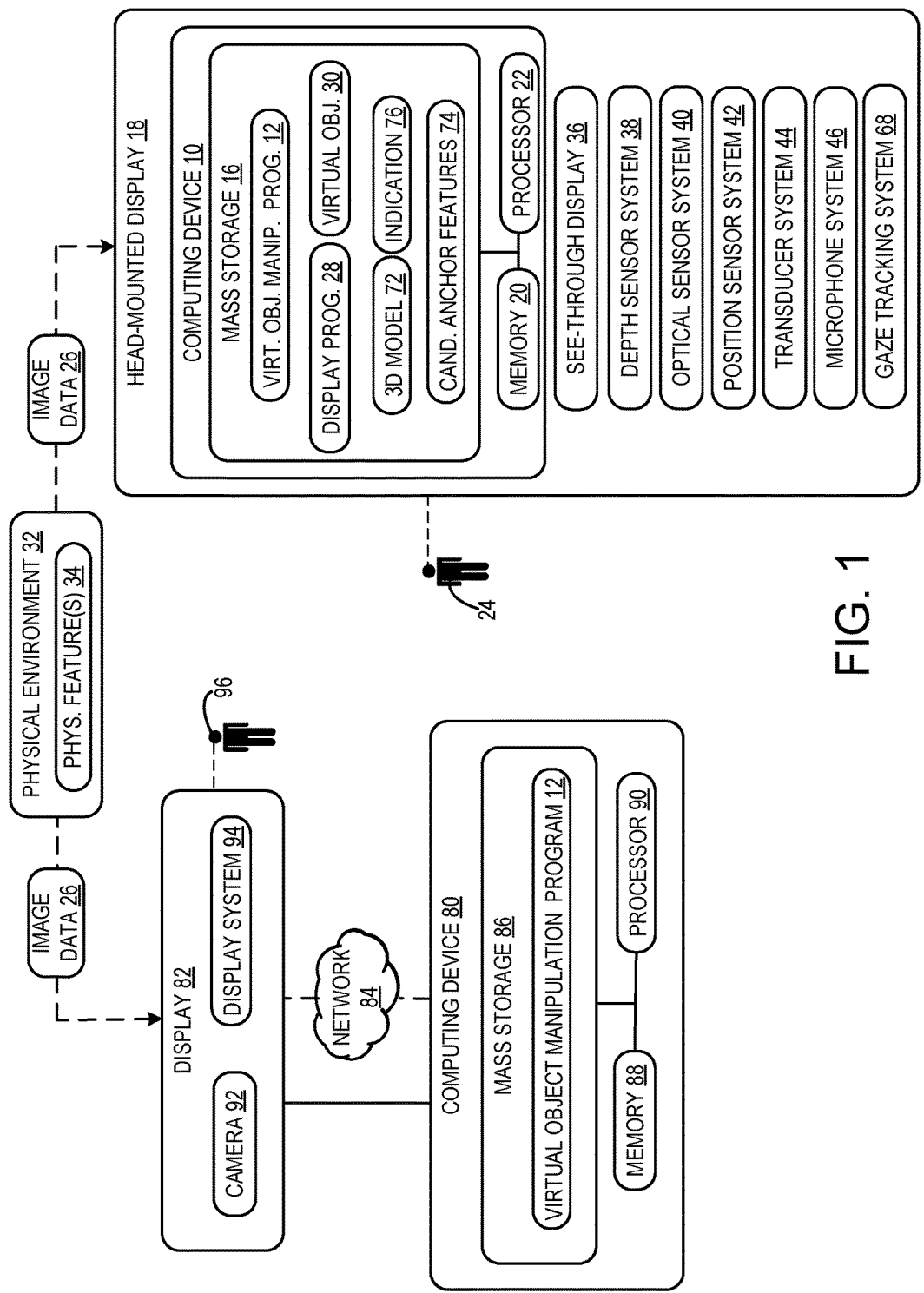
FIG. 1 is a schematic view of example computing devices and display devices that may display and manipulate a virtual object according to examples of the present disclosure.

In a real world physical environment, a person who is physically handling and positioning a first object with respect to a second object may be guided by real world phenomena. For example, someone stacking books on a table is aided by gravity which aligns the books to the supporting surface of the table, and by the inability of the books to penetrate the table surface.

In an augmented reality environment, a user may view a real world physical environment that includes virtual content displayed within the physical environment. For example and as described in more detail below, a head-mounted display (HMD) device may include a see-through display configured to visually augment a view of a real world three dimensional environment through the display. In other examples, virtual content may blended with real-world imagery of the user's real world environment. For example, tablet computers, mobile communication devices, notebook computers, and similar devices may display virtual content that is blended with real-world imagery of the user's real world environment. Other examples of displaying virtual content within a real world physical environment may include projection-based solutions, such as projectors installed in space or projectors worn on the body of a user.

In an augmented reality environment, virtual objects do not necessarily follow the same physical phenomena or rules of physics as do physical objects in the real world. Accordingly, manipulating virtual content to align or coordinate with a physical object or surface in the user's physical environment may be challenging. For example, in augmented reality applications that enable movement of virtual content in six degrees of freedom (6DOF), manipulating and orienting a virtual object so that it precisely aligns with a physical object in the real world environment can be cumbersome. An example of this challenge might be attempting to manipulate a holographic planar painting to hang flat on a real world wall.

Additionally, in an augmented reality environment the virtual content may be displayed from the user's point of view and in context with the surrounding physical environment. In some examples, such as with an HMD device having a see-through display, a zoomed-out view of the entire physical environment may not be available. Similarly, a zoomed-in view of the details of an alignment between a virtual object and a physical object may not be an option. These and other considerations may prevent a user from easily and quickly aligning virtual content within a real world physical environment.

The present disclosure is directed to methods, computing devices and display devices that provide an interactive augmented reality experience that enables users to easily and quickly manipulate virtual content with precision in a real world physical environment. In one potential advantage of the present disclosure, users may utilize the real world physical objects, surfaces and geometries around them to easily position virtual objects in their environment.

With reference now to FIG. 1, a schematic view of example implementations of computing and display devices for manipulating a displayed virtual object is provided. In one example a computing device 10 is integrated into a head-mounted display (HMD) device 18. Computing device 10 may include a virtual object manipulation program 12 comprising instructions that may be stored in mass storage 16. The virtual object manipulation program 12 may be loaded into memory 20 and executed by a processor 22 to perform one or more of the methods and processes described herein. Additional details regarding the components and computing aspects of the computing device 10 are described in more detail below with reference to FIG. 21

The HMD device 18 may create and display to a first viewer 24 an augmented reality environment comprising virtual content. The HMD device 18 may include a display program 28 that generates such virtual content for display via the HMD device. The virtual content may include one or more visual elements in the form of virtual objects 30, such as three-dimensional (3D) holographic objects and two-dimensional (2D) virtual images, that are generated and displayed to appear located within a real world physical environment 32 viewed through the device. In this manner, the HMD device 18 may create an augmented reality environment that enables the viewer to perceive such virtual objects 30 as positioned within the physical environment 32 surrounding the viewer. As discussed in more detail below, the physical environment 32 may include physical objects having physical features 34, such as edges, planar surfaces, etc.

In some examples the HMD device 18 may comprise an at least partially see-through display 36 that is supported in front of a user's eye or eyes, thereby giving the user a view of his or her surroundings. Any suitable display technology and configuration may be used to display images via the at least partially see-through display 36. For example, the at least partially see-through display 36 may be configured to enable a wearer of the HMD device 18 to view a physical, real-world object in the physical environment through one or more partially transparent pixels that are displaying a virtual object representation. The at least partially see-through display 36 may include image-producing elements such as, for example, a see-through Organic Light-Emitting Diode (OLED) display.

As another example, the HMD device 18 may include a light modulator on an edge of one or more at least partially see-through display panels. In this example, the panel(s) may serve as a light guide for delivering light from the light modulator to the eyes of a wearer. Such a light guide may enable a wearer to perceive virtual content located within the physical environment that the wearer is viewing. In other examples the display panels may utilize a liquid crystal on silicon (LCOS) display.

The HMD device 18 may include various sensors and related systems that receive physical environment data from the physical environment 32. For example, the HMD device 18 may include a depth sensor system 38 that generates depth image data. The depth sensor system 38 may include one or more depth cameras that capture image data 26 from the physical environment 32. In some examples the depth camera(s) may be an infrared time-of-flight depth camera. In other examples the depth camera(s) may take the form of a structured light depth camera. Any suitable depth tracking system and technology may be utilized.

In some examples the HMD device 18 may include an optical sensor system 40 that utilizes at least one outward facing sensor, such as an RGB camera, IR sensor or other optical sensor. The outward facing sensor may capture image data 26 in the form of color, IR or other light information from the physical environment 32. In some examples such image data 26 may be used by the processor 22 to detect movements within a field of view of the HMD device 18, such as gesture-based inputs or other movements performed by a wearer (e.g., a pinching of fingers, closing of a fist, pointing with a finger or hand, etc.), that indicate an action to be taken, a selection of a virtual object displayed via the HMD device 18, or other user input.

Data from the optical sensor system 40 also may be used by the processor 22 to determine direction/location and orientation data (e.g., from imaging environmental features) that enables position/motion tracking of the HMD device 18 in the real world physical environment 32. Such data also may be used to identify surfaces and/or measure one or more surface parameters of the physical environment 32.

The HMD device 18 may also include a position sensor system 42 comprising one or more accelerometers, gyroscopes, inertial measurement units, head tracking systems, and/or other sensors for determining a position and/or orientation of the device. The relative position and/or orientation of the HMD device 18 relative to the physical environment 32 may be assessed so that virtual content may be accurately displayed in desired real-world locations with desired orientations.

In some examples, a 6 degree-of-freed (6DOF) position sensor system may be used to display virtual content in a world-locked manner. A world-locked virtual object, such as a hologram, appears to be fixed relative to real world objects viewable through the HMD device 18, thereby enabling a wearer of the HMD device to move around a real world physical environment while perceiving the virtual object as remaining stationary in a fixed location and orientation in the physical environment.

In other examples, the HMD device 18 may operate in a body-lock display mode in which one or more virtual objects may be displayed via the HMD device with body-locked positions. In a body-locked position, a holographic object appears to be fixed relative to the wearer of the HMD device 18, and the body-locked position of the holographic object appears to be moveable relative to real-world objects.

The HMD device 18 may also include a transducer system 44 comprising one or more actuators that convert an electrical signal into another form of energy. In some examples, the transducer system 44 may include one or more speakers for providing audio feedback to a viewer. In other examples the transducer system 44 may include one or more tactile transducers for generating and providing haptic feedback to the viewer, such as vibrations. The HMD device 18 may also include a microphone system 46 and one or more microphones for receiving audio input from the physical environment.

Computing device 10 may receive gaze tracking data from a gaze tracking system 68 of the HMD device 18. In some examples, one or more inward-facing light sources and image sensors may collect image information that is used to measure gaze parameters of the user's eyes. Using this information, the processor 22 may execute instructions to determine a direction in which the user is gazing and/or an identity of a physical and/or virtual object at which the user is gazing. Using the gaze tracking data, the processor 22 may execute instructions to monitor the gaze location of a viewer within the physical environment 32 and relative to physical features 34 and virtual content displayed within the physical environment. In other examples, any suitable gaze tracking technology may be utilized.

In some examples, a 3D model 72 of at least a portion of the physical environment 32 may be generated by HMD device 18 and utilized to display and manipulate virtual objects 30 within the physical environment. The 3D model may include surface reconstruction information that may be used to identify physical features 34, such as objects and surfaces, in the physical environment.

As described in more detail below, candidate anchor features 74 may be extracted from the image data 26, where the candidate anchor features correspond to physical features 34 in the real world physical environment 32. At least one correspondence between a virtual anchor feature of a virtual object 30 and a corresponding candidate anchor feature 74 may be identified. Using this correspondence, the HMD device 18 may display an indication 76 of the corresponding candidate anchor feature at its corresponding physical feature within the physical environment. As described in the example use cases below, displaying such indication enables a user to utilize the physical features of the physical environment to easily and accurately position virtual objects in the environment.

The example illustrated in FIG. 1 shows the computing device 10 integrated into the HMD device 18. It will be appreciated that in other examples the computing device 10 may be a separate component from the HMD device 18 that is communicatively coupled to the device. Additionally, many types and configurations of HMD devices 18 having various form factors may be used and are within the scope of the present disclosure. In some examples, one or more of the above-described sensor systems or other data gathering systems may be located externally to the HMD device 18.

With continued reference to FIG. 1, an example of a computing device 80 that is physically separated from a display device 82 is shown. In this example, the computing device 80 may comprise or be integrated into a separate device, such as a set-top box, gaming console, or other like device that does not include an integrated display.

The computing device 80 may be operatively connected with the display device 82 using a wired connection, or may employ a wireless connection via WiFi, Bluetooth, or any other suitable wireless communication protocol. For example, the computing device 80 may be communicatively coupled to a network 84. The network 84 may take the form of a local area network (LAN), wide area network (WAN), wired network, wireless network, personal area network, or a combination thereof, and may include the Internet. Additional details regarding the components and computing aspects of the computing device 80 are described in more detail below with reference to FIG. 21.

As with computing device 10, computing device 80 may include virtual object manipulation program 12 that may be stored in mass storage 86. The virtual object manipulation program 12 may be loaded into memory 88 and executed by a processor 90 to perform one or more of the methods and processes described in more detail below.

The example display device 82 may include a camera 92 for capturing image data 26 of the physical environment 32 and a display system 94 for presenting visual content to a second viewer 96. In some examples, the display device 82 may include one or more of the sensor, transducer, microphone and gaze tracking systems of the HMD device 18 described above.

In other examples, the computing device 80 may comprise or be integrated into the display device 82, and may take the form of a tablet, notebook, mobile computing device, wall-mounted display, or other like device having an integrated display. In some examples, one or more external cameras and other sensors (not shown) may capture data regarding a position or orientation of the display device 82 and provide such data to the computing device 80. For example, one or more externally mounted depth cameras, RGB cameras and/or IR cameras may track a position and orientation of the display device 82 and provide such data to computing device 80.

Figure 2:
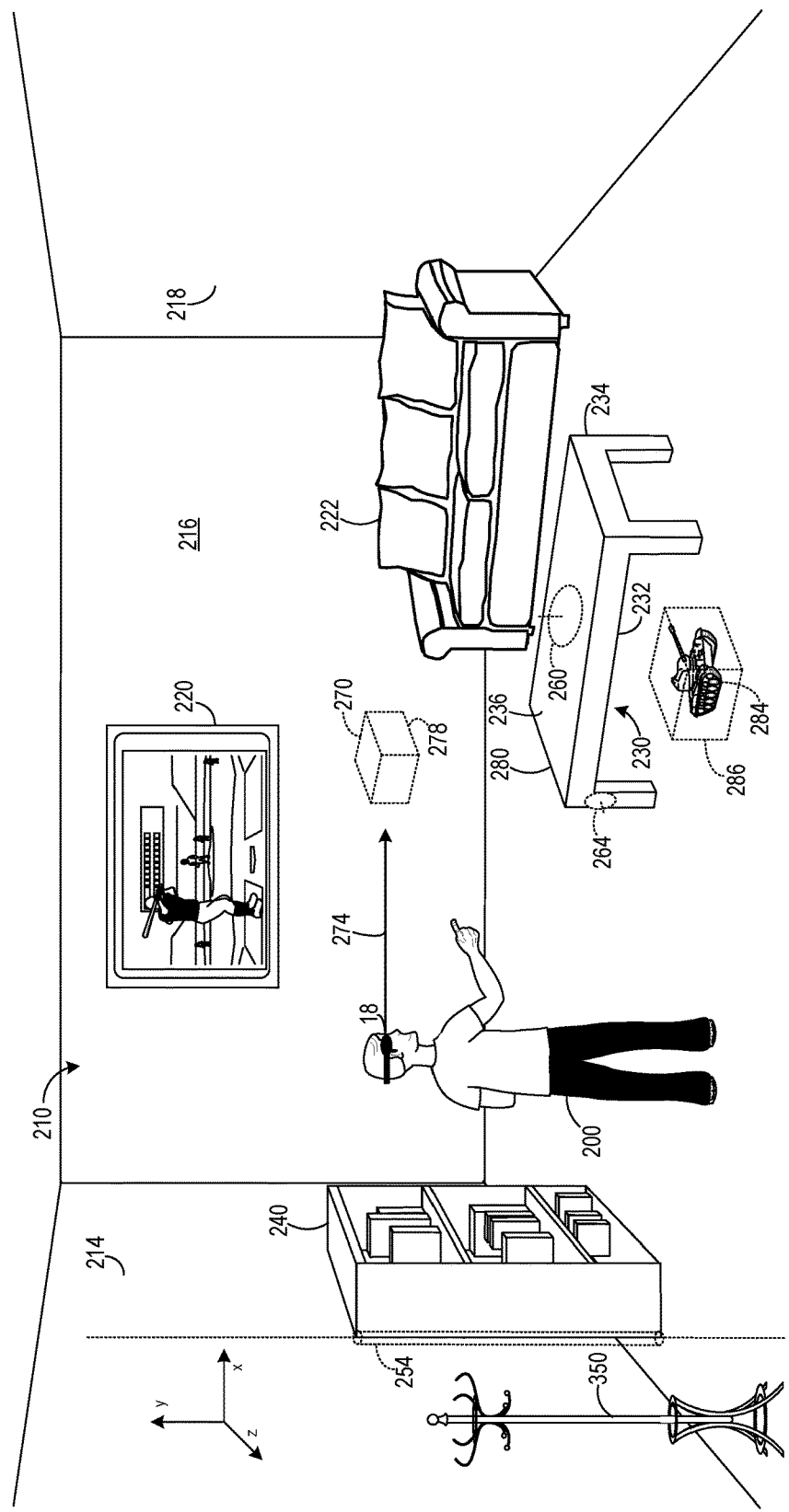
FIG. 2 shows a user wearing the head-mounted display device of FIG. 1 in a real world physical environment according to an example of the present disclosure.

With reference now to FIGS. 2-19, descriptions of example use cases of the present disclosure will now be provided. FIG. 2 is a schematic illustration of a user 200 wearing HMD device 18 and standing in the real world physical environment of room 210. The room 210 includes a number of physical objects and surfaces, such as walls 214, 216 and 218, wall-mounted display 220, couch 222, table 230, and bookcase 240. Each of the physical objects may comprise one or more physical features, such as linear edges, midpoints of linear edges or lines, planar surfaces, planes parallel to and spaced from a planar surface, corners, and angles. For example, table 230 has a number of linear edges, such as edges 232 and 234, and a number of planar surfaces, such as table top 236. In other examples, physical features of a physical object may comprise one or more of a volume, orientation, and size of an object.

These physical features may represent useful semantic information, such as supporting horizontal surfaces, floors, walls that separate spaces, etc. For example, some linear edges may distinguish objects from other objects behind them, or may represent a change in an object's surface normal. Other linear edges may result from a visible change of the object's color.

As noted above, the HMD device 18 may generate a 3D model of at least a portion of the room 210 using the image data 26, position and/or orientation data of the HMD device 18. The virtual object manipulation program 12 may be executed to extract from the image data 26 a plurality of candidate anchor features 74 that each correspond to one of the physical features in the room 210. For example, candidate anchor features in the form of selected 3D linear edges and planar surfaces of physical objects in room 210 may be determined from the image data.

With reference now to FIG. 3, in one example candidate anchor features 74 in the form of 3D line segments, such as segments 310, 320 and 330, each of which corresponds to selected linear edges of the bookcase 240 in room 210, are determined from the image data 26. In this example, fewer than all linear edges of the bookcase 240 are represented by line segment candidate anchor features. As described in more detail below, these extracted line segments may be utilized to display indications of the candidate anchor features 74 corresponding to these segments, such as virtual cylinder indication 254 illustrated in FIG. 2.

In one example of extracting candidate anchor features 74 in the form of three dimensional line segments, depth data may be used to detect depth edges. The depth data may be temporarily smoothed using an exponential filter, such as:

filteredDepth$i$=α×depth$i$+(1−α)×filteredDepth$i$−1, where α=0.3. Surface normals are computed at each point in the depth image and used to detect surface normal edges. Additionally, color image data may be used to detect color edges.

The most dominant lines may be extracted from each depth image component, normals component, and/or color image component. For example, a Hough Transform may be run on edge points detected by a Canny edge detection technique. Inlier edge points along the each Hough line may be extracted using a variant of RANSAC to generate a more accurate line equation. Finally, each 2D line is divided into segments which have a density of edge points greater than a predetermined threshold. In some examples, the location of depth edges may be shifted slightly to lie on a near-occluding object that originated the edge.

The 2D line segments extracted from all modalities are back projected into 3D space of the 3D model, provided each segment has a sufficient number of valid depth values along its length. RANSAC then may be used to fit 3D linear segments through the 3D edge points.

Temporal noise in the positioning, orientation, and/or extent of the extracted segments may be reduced by using a Kalman filter. Such filtering may enhance the consistency of the segments over successive frames of image data. Extracted segments may be associated with existing edges based on proximity and similarity of their orientation. In some examples, the foregoing process for extracting candidate anchor features 74 in the form of three dimensional line segments may be performed at 15 Hz, 30 Hz, 60 Hz, or other suitable frequency.

As explained in more detail below, an indication of an extracted segment (a corresponding candidate anchor feature) may be displayed to a user to assist the user in aligning a virtual object with the physical object corresponding to the extracted segment. In other examples, indications of other corresponding candidate anchor features that are different from extracted line segments may be displayed to a user to assist the user in aligning a virtual object with the physical object corresponding to the candidate anchor feature. Such other corresponding candidate anchor features may include, for example, different geometrical features such as planes, cylinders, spheres, curved surfaces, volumes, dimensions, repeating distances between objects, and objects' relative locations and orientations.

In some examples, an indication will not be displayed in a current frame unless it has been displayed in at least a predetermined number of previous frames. For example, an indication will be displayed if it has been displayed in at least five frames immediately preceding the current frame. In this manner, the chance of a user relying on false positives from the edge extraction process may be minimized. Any other suitable number of previous frames may be utilized according to the sampling frequency and other relevant factors.

In some examples a user's physical environment may be dynamically changing. For example and with reference to FIG. 2, another person may walk into the room 210 and may pass between the HMD device 18 and the table 230, thereby temporarily blocking the acquisition of image data of the table by the device. In other examples, objects may be moved within the room 210 or removed from the room, the user 200 may change positions in the room, new objects may be brought into the room, etc. In some examples a user may move a physical object in the room 210 to generate different and/or additional guidelines for manipulating virtual objects. Accordingly in some of these examples, image data containing a particular candidate anchor feature may be unavailable.

More particularly, in some examples after detecting a candidate anchor feature in a frame of image data at a 3D location in the 3D model 72, the candidate anchor feature may not be detected in subsequent frames of the image data. However, such particular candidate anchor feature still may have value to a user, such as where the corresponding physical feature/object is temporarily occluded from view, or a particular location of a linear edge remains useful.

To address such situations and in some examples, the particular candidate anchor feature will be maintained at its initial three dimensional location in the 3D model until expiration of a predetermined period of time after the initial time. Such predetermined period of time may be, for example, one second, two seconds or any suitable period of time. In some examples where the particular candidate anchor feature is currently being used to align a virtual object, the predetermined period of time may extend until the alignment of the virtual object is completed. Upon expiration of the predetermined period of time after the initial time, the candidate anchor feature may be removed from the model. In this manner, situations such as short periods in which a candidate anchor feature is obscured from view, the collusion of candidate anchor features as a result of the user's motion, movement of physical objects in the scene, and/or other changes in the physical environment may be addressed.

With continued reference to FIG. 3, in some examples candidate anchor features 74 in the form of planar surfaces, such as planar surfaces 340 and 350 corresponding to selected planar surfaces of the table 230 in room 210, are determined from the image data 26. In this example, fewer than all planar surfaces of the table 230 are represented by planar surface candidate anchor features. As described in more detail below, these planar surface candidate anchor features may be utilized to display indications of the candidate anchor features 74 corresponding to these surfaces, such as the virtual circle indications 260 and 264 illustrated in FIG. 2.

In one example of extracting candidate anchor features 74 in the form of planar surfaces, such surfaces may be detected utilizing any suitable scene analysis method or technique. For example, surface reconstruction techniques, such as techniques using contour completion models, may be utilized. Depth image normals may be utilized to develop a plane equation parameterized by its azimuth, elevation, and distance from the origin. A Hough transform on 3D depth points may be used to detect major plane equations in the scene.

In some examples a greedy heuristic may be used to associate scene points with those planes. Unassigned 3D points may be associated with a candidate plane if they lie in the vicinity of the candidate plane, such as within 10 cm., and have compatible normal directions, such as within 10° of the candidate plane normal. In some examples for candidate planes beyond a predetermined distance from the depth camera, a range for such compatible normal directions may be increased, such as to approximately 20°, to account for increasing depth data noise. In some examples, the foregoing process for extracting candidate anchor features 74 in the form of three dimensional planar surfaces may be performed at 2 Hz, 4 Hz, 10 Hz, or other suitable frequency.

With reference again to FIG. 2, the candidate anchor features 74 extracted from image data 26 may be utilized to help user 200 manipulate virtual content as displayed by HMD device 18 within room 210. In one example, HMD device 18 may display a virtual object in the form of a 3D holographic cube 270 floating in the room 210. As described in more detail below, the holographic cube 270 may comprise one or more virtual anchor features that may be utilized to identify and indicate to the user corresponding candidate anchor features on physical objects in the room. In some examples, virtual anchor features of a virtual object such as the holographic cube 270 may comprise linear edges and planar surfaces. In some examples of virtual objects, such as the holographic tank 284 in FIG. 2, the object's virtual anchor features may be defined by a bounding box, such as bounding box 286, to thereby facilitate alignment with physical edges and planar surfaces (corresponding anchor features) of physical objects.

In some examples the HMD device 18 may enable the user 200 to interact with the virtual cube 270 via gaze detection of the user's gaze at the cube. In other examples such interaction may be effected by detecting a ray 274 that is cast from the HMD device and intersects with the cube 270, by receiving a user voice command that selects the cube for interaction, or any other suitable user interaction technique. For purposes of the examples described herein, various forms of user input may be provided by one or more of gaze detection, ray casting, head position/orientation detection, voice command recognition, gesture detection, hand-held remote control input, and any other suitable techniques for providing user input.

The user 200 may provide user manipulation input to the HMD device 18 that manipulates the holographic cube 270. In some examples, the user may position, orient and scale the cube 270 via the user's head gaze direction and/or other forms of user manipulation input. In one example, by altering his head gaze direction the user 200 may move the cube 270 around the room 210. A distance between the cube 270 and the HMD device 18 may be controlled by user voice commands, such as "Back" and "Forward." In another example of scaling the cube 270, the user 200 may deselect the cube, gaze at a corner of the cube, voice a "Scale It" command, and move his gaze away from the corner to uniformly increase the size of the cube.

Figure 4:
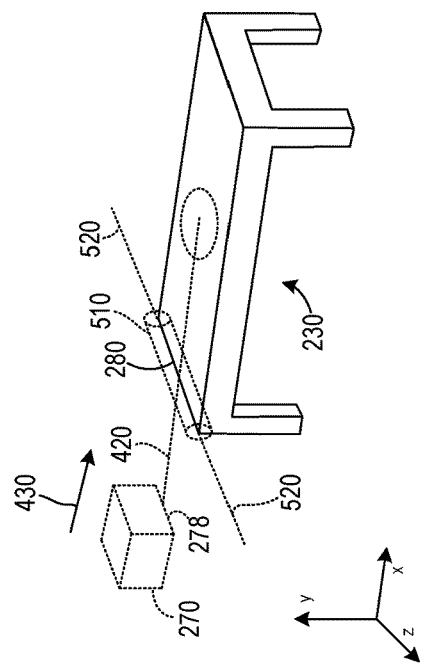
FIGS. 4-7 show an edge of a virtual cube aligning with an edge of a physical table according to an example of the present disclosure.

In some examples user 200 may desire to align a linear edge or planar surface of the holographic cube 270 with an edge or surface of a physical object in room 210, such as the table 230. With reference now to FIGS. 4-7, in one example the user 200 may desire to align a bottom linear edge 278 of cube 270 with the top linear edge 280 of the table 230. As shown in FIG. 4, initially the user 200 may manipulate the cube 270 by, for example, selecting the cube for user interaction and moving the cube upward in the direction of arrow 400. In other examples a user may manipulate a virtual object by changing its orientation, modifying its shape, or otherwise interacting with the virtual object.

The HMD device 18 may receive the user manipulation input from the user 200. Based on the user's manipulation of the cube 270, the virtual object manipulation program 12 may identify at least one correspondence between a virtual anchor feature of the virtual object (cube 270) and a corresponding candidate anchor feature from a plurality of candidate anchor features in the room 210. In this example, each of the 12 linear edges and the 6 rectangular planar surfaces of the holographic cube 270 are a virtual anchor feature of the cube. As explained above, the HMD device 18 extracts a plurality of candidate anchor features that each correspond to a physical feature of a physical object in the room 210. In this example, the planar surface of table top 236 and each of the 4 top linear edges 280, 288, 290 and 292 are each a candidate anchor feature.

As the user 200 moves the cube 270 upward in the direction of arrow 400, the virtual object manipulation program 12 may identify a correspondence between the upper planar surface 294 of the cube 270 and the planar surface of table top 236 (a corresponding candidate anchor feature). In one example, the correspondence may comprise the surface normals of table top 236 and upper planar surface 294 of cube 270 being within a predetermined threshold of parallel, such as within 30 degrees, 45 degrees, 60 degrees or any suitable threshold. In other examples, a correspondence may comprise the surface normals of table top 236 and upper planar surface 294 of cube 270 being within a predetermined threshold of orthogonal, such as within 30 degrees, 45 degrees, 60 degrees or any suitable threshold.

In another example the correspondence may comprise the movement of the upper planar surface 294 of cube 270 in a direction toward the table top 236, indicating a potential user interest in aligning these two surface. In this example, the virtual object manipulation program 12 may analyze the upper planar surface 294 and table top 294 in the context of such movement to generate an inference that the user may be interested in aligning these two surfaces. In another example, the correspondence may comprise a combination of the surface normals being within a predetermined threshold of parallel and the movement of the upper planar surface of cube 270 toward table top 236.

In some examples where multiple correspondences with multiple corresponding candidate anchor features are identified, the corresponding candidate anchor feature having the lowest cost according to a cost function may be utilized. In one example, the cost of a corresponding candidate anchor feature is a linear combination of (a) the distance between the virtual anchor feature centroid and its projection onto the corresponding candidate anchor feature and (b) the distance between the virtual anchor feature centroid and the centroid of the corresponding candidate anchor feature. In some examples, one or both of the distances (a) and (b) may be weighted to increase or decrease the cost value. In this example, the second component (b) of this linear combination favors planar surfaces that are near to the virtual anchor feature surface.

In some examples, corresponding candidate anchor features that have been previously selected for use with a virtual anchor feature may be favored over candidate anchor features that have not been previously selected or have been selected less often. For example, where the user 200 has placed virtual objects on the table top 236 twice as frequently as any other planar surface in the room 210, the corresponding candidate anchor feature of the table top 236 may be favored for selection over the other planar surfaces. In some examples, the frequency of selection of table top 236 by other users also may be considered in favoring or disfavoring this candidate anchor feature. In this manner, those candidate anchor features that are more popular with users may be identified and utilized more frequently. Additionally, other examples of correspondences that may suggest a potential user interest in aligning a virtual anchor feature with a corresponding candidate anchor feature may be utilized and are within the scope of the present disclosure.

In some examples when a correspondence is identified, the cube 270 may be rotated and/or translated so that its upper planar surface 294 is parallel to and coplanar with the corresponding candidate anchor feature planar surface of table top 236. In other examples, the cube 270 may be rotated and/or translated so that its upper planar surface 294 is orthogonal to the corresponding candidate anchor feature planar surface of table top 236.

With continued reference to FIG. 4, based on identifying the correspondence between the upper planar surface 294 of the cube 270 and the corresponding candidate anchor feature of the planar surface of table top 236, the HMD device 18 displays to the user 200 an indication of the corresponding candidate anchor feature at its corresponding physical feature (the table top surface). In the example of FIG. 4, the HMD device 18 displays an indication in the form of a virtual circular region 410 that is coplanar with and located at the centroid of the table top 236. In this example the indication also includes a linear segment 414 extending upwardly from the center of the circular region 410 normal to the plane of the table top. The virtual circular region 410 and linear segment 414 may be displayed in a world-locked manner in which their position and orientation appear to be fixed relative to the table 230 and other physical objects in room 212. In this manner, the user 200 is provided with a visual indication that highlights the planar nature of the table top 236, thereby informing the user that alignment with this physical surface is available.

In the example of FIG. 4, the indication of the corresponding candidate anchor feature representing the table top 236 also includes an extension 420 that is displayed to extend from the center of the circular region parallel to the planar table top surface 236 and beyond the physical table top 236. In this example, the direction of the extension 420 is selected based on the direction of movement of the holographic cube 270, indicated by arrow 400, such that continued movement of the cube in this direction will cause the cube to intersect with the extension 420. Accordingly, by positioning the extension 420 to extend over the holographic cube 270 as viewed from the y-axis direction, the user 200 may easily coordinate the position of the cube relative to the planar surface of the table top 236. In other examples, indications having different shapes and forms may be utilized to indicate corresponding candidate anchor features that represent planar surfaces.

Figure 5:
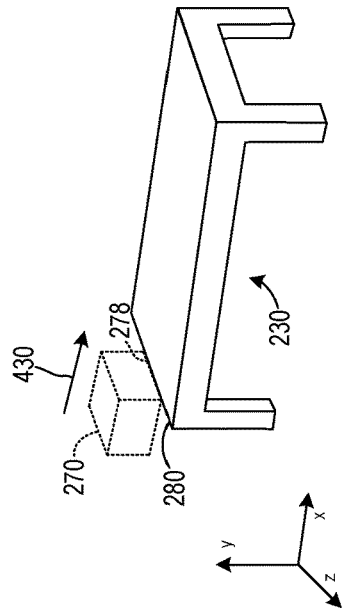
Figure 6:
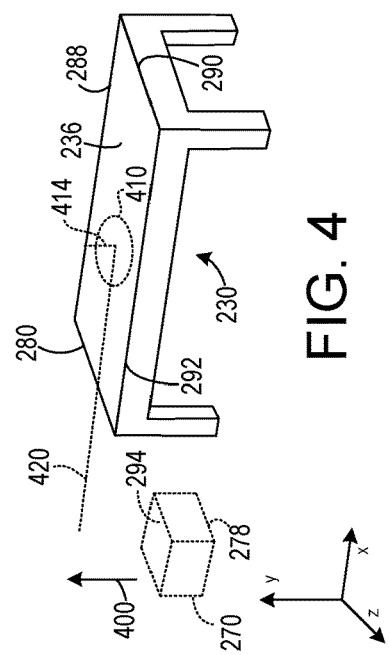

With reference now to FIGS. 5 and 6, the user 200 may raise the cube 270 until a bottom surface of the cube meets the extension 420. The user may then begin moving the cube 270 in the x-axis direction indicated by arrow 430 toward the top linear edge 280 of the table 230, which as noted above is represented by a candidate anchor feature of the table. As the user moves the cube 270 in the direction of arrow 430, the virtual object manipulation program 12 may identify a correspondence between the bottom linear edge 278 of the cube 270 and the corresponding candidate anchor feature of the top linear edge 280 of the table. In one example, the correspondence may comprise the bottom linear edge 278 and top linear edge 280 being within a predetermined threshold of parallel, such as within 10 degrees, 20 degrees, 30 degrees or any suitable threshold. In another example the correspondence may comprise the movement of the bottom linear edge 278 of cube 270 in a direction toward the top linear edge 280 of the table, indicating a potential user interest in aligning these two edges. In another example, the correspondence may comprise a combination of the edges being within a predetermined threshold of parallel and the movement of the bottom linear edge 278 toward the top linear edge 280.

In another example, a correspondence may comprise the distance between the midpoint of the bottom linear edge 278 and its projection onto the top linear edge 280 being within a predetermined threshold distance, such as 10 cm, 20 cm, 30 cm, or other suitable distance, and the bottom linear edge and top linear edge being within a predetermined threshold of parallel, such as within 10 degrees, 20 degrees, 30 degrees or any suitable threshold.

As noted above with respect to planar surfaces, in some examples where multiple correspondences with multiple corresponding candidate anchor features representing linear edges are identified, the corresponding candidate anchor feature having the lowest cost may be utilized, where the cost is a linear combination of (a) the distance between the virtual anchor feature edge midpoint and its projection onto the corresponding candidate anchor feature physical edge and (b) the distance between the virtual anchor feature edge midpoint and the edge midpoint of the corresponding candidate anchor feature. In some examples, one or both of the distances (a) and (b) may be weighted to increase or decrease the cost value. In this example, the second component (b) of this linear combination favors edges that are near to the virtual anchor feature edge.

As noted above and in some examples, corresponding candidate anchor feature edges that have been previously selected for a virtual anchor feature may be favored over candidate anchor feature edges that have not been previously selected or have been previously selected less often. Additionally, other examples of correspondences that may suggest a potential user interest in aligning a virtual anchor feature with a corresponding candidate anchor feature may be utilized and are within the scope of the present disclosure.

In some examples when a correspondence is identified, the cube 270 may be rotated and/or translated so that its bottom linear edge 278 is parallel to and overlapping the corresponding candidate anchor feature edge.

With continued reference to FIGS. 5 and 6, based on identifying the correspondence between the bottom linear edge 278 of the cube 270 and the corresponding candidate anchor feature of the top linear edge 280 of the table, the HMD device 18 may display an indication of the corresponding candidate anchor feature at its corresponding physical feature within the real world physical environment. In the example of FIGS. 5 and 6, the HMD device 18 displays an indication in the form of a virtual cylinder 510 that extends along the edge 280 of the table 230. In this example the virtual cylinder 510 has substantially the same length as the edge 280 and is coaxial with the edge 280. The virtual cylinder 510 may have a degree of transparency such that edge 280 is still visible to the user 200, or it may be opaque. The virtual cylinder 510 may be displayed in a world-locked manner such that its position and orientation appear to be fixed relative to the table 230 and other physical objects in room 212. In this manner, the user 200 is provided with a visual indication that highlights the top linear edge 280, thereby informing the user that alignment with this physical edge is available.

In the example of FIGS. 5 and 6, the indication of the corresponding candidate anchor feature representing the top linear edge 280 also includes an extension 520 that is displayed to extend from the center of the virtual cylinder 510 collinear with the axis of the cylinder and beyond each end of the edge 280. In this manner, the virtual object manipulation program 12 enables the user 200 to clearly see the position and orientation of the table edge 280. In some examples and as described in more detail below, displaying such an extension may help the user 200 align a virtual object with a candidate anchor feature that is not visible to the user or is otherwise difficult to see, such as a physical edge that is located behind or far away from the user. In other examples, indications having different shapes and forms may be utilized to indicate corresponding candidate anchor features that represent linear edges.

Figure 7:
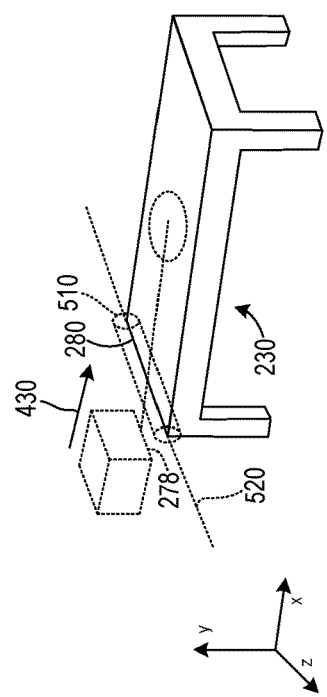

With reference now to FIG. 7, the user 200 may provide a user selection input to cause the virtual bottom linear edge 278 of cube 270 to align with the physical table edge 280. The user selection input may comprise, for example, one or more of gaze detection, ray casting, head position/orientation, voice commands, gesture detection, hand-held remote control input, and any other suitable techniques for providing user input. In this example, aligning the virtual bottom linear edge 278 with the physical table edge 280 comprises rotating and translating the cube 270 to position the virtual edge parallel to and contiguous with the physical edge, such that the two edges appear to be touching as shown in FIG. 7. In other examples, aligning a virtual anchor feature edge with a corresponding candidate anchor feature edge may comprise orienting the virtual object such that the virtual edge is parallel to and spaced from the physical edge.

With reference again to FIG. 2, in some examples the complexity of real world geometry may create a dense and noisy set of candidate anchor features that may be extracted. Sensor noise from one or more of the sensors of HMD device 18 also may contribute to a high density of candidate anchor features. In some examples, a high density of candidate anchor features may negatively affect the ability of users to effectively utilize real world objects, surfaces and geometries to manipulate virtual objects as described herein.

In some examples, the virtual object manipulation program 12 may enable a user to actively preselect one or more candidate anchor features for extraction. In this manner and by putting the user in the loop of the candidate anchor feature extraction process, the effects of real world geometry complexity and sensor noise may be diminished. In one example and with reference again to FIG. 2, the user 200 may preselect the top linear edge 280 of table 230 by providing user preselection input to the HMD device 18. Such user preselection input may take the form of one or more of gaze detection, ray casting, head position/orientation, voice commands, gesture detection, hand-held remote control input, and any other suitable techniques for providing user input.

As the user maneuvers the virtual cube 270 around the table 230, the virtual object manipulation program 12 may also utilize this user preselection of the linear edge 280 to identify a correspondence between the virtual anchor feature edge 278 and the corresponding candidate anchor feature of the linear edge 280. More particularly and based on this preselection input, the corresponding candidate anchor feature of the linear edge 280 may be prioritized for selection over other candidate anchor features corresponding to other physical features of the table 230 and other physical objects in room 210. In some examples and based on this preselection input, indications of other candidate anchor features may not be displayed to the user 200, while an indication of the preselected linear edge 280 is displayed as shown in FIGS. 5 and 6.

In some examples, a user may deselect one or more corresponding candidate anchor features. Based on providing such user deselection input, the deselected corresponding candidate anchor features may not be selected and indications of such candidate anchor features may not be displayed. Such user deselection input also may reduce the density of candidate anchor features that are extracted.

In some examples, potential negative effects of complex real world geometries and/or sensor noise may be reduced by limiting the types (and correspondingly the number) of candidate anchor features that are extracted. In one example, less than all of the available virtual anchor features of a virtual object may be utilized. In other words, the virtual object may be defined to exclude one or more virtual anchor features from being available for alignment.

For example, the virtual cube 270 has 6 planar surfaces. To limit the number of candidate anchor features that are extracted, each of the cube's planar surfaces may be constrained to align solely with physical planar surfaces and correspondingly may be prevented from aligning with physical corners or edges. Accordingly, the extraction process for extracting candidate anchor features from the image data may ignore features corresponding to such physical corners and edges in the physical environment. In this manner, fewer candidate anchor features may be extracted, thereby reducing the density of potential candidate anchor features indicated and/or utilized for alignment, and also potentially reducing the computational resources needed for the extraction process.

In some examples, potential negative effects of complex real world geometries and/or sensor noise may be reduced by generating a filtered plurality of candidate anchor features based on one or more criteria. For example, the plurality of candidate anchor features available in room 210 may be filtered based a distance between the HMD device 18 and each of the candidate anchor features. In some examples, a candidate anchor feature located closer to the HMD device 18 may be favored over another candidate anchor feature located further from the display. In another example, a distance between a virtual object, such as cube 270, and each of the candidate anchor features in room 210 may be utilized. For example, a candidate anchor feature located closer to the cube 270 may be favored over another candidate anchor feature located further from the cube.

In some examples, whether a candidate anchor feature is within a field of view of the display device may be utilized. For example, a candidate anchor feature that is not within the field of view of HMD device 18 may be made unavailable for selection, or may be less favored than other candidate anchor features within the field of view. In some examples, a frequency of prior use of each of the candidate anchor features may be utilized to prioritize the features. For example, a priority of a candidate anchor feature may be increased or decreased in proportion to its frequency of prior use in aligning virtual objects. In some examples, user filtering input provided by a user may be utilized to prioritize the candidate anchor features. For example, speech recognition may be utilized to recognize and execute a voice command from the user to filter such features, such as "Snap to features only from the bookshelf."

In some examples, at least one correspondence between the virtual anchor feature of a virtual object and a corresponding candidate anchor feature may be identified from a plurality of candidate anchor features that are filtered according to one or more of the above criteria. In this manner and as noted above, fewer candidate anchor features may be extracted, thereby reducing the density of potential candidate anchor features indicated and/or utilized for alignment, and potentially reducing the computational resources needed for the extraction process.

In some examples, a physical object that may include one or more candidate anchor features may be located in a non-visible location in the real world physical environment that is outside a field of view of the display device. For example and with reference to FIG. 8, user 200 may desire to place the virtual baseball in virtual display box 710 on the top planar surface 296 of the bookcase 240. As shown in FIG. 8, because the user 200 is looking away from the bookcase 240, the top planar surface 296 is in a location that is not visible to the user and is outside a field of view 720 of the HMD device 18. The user 200 may select the box 710, such as by pointing at the box, and may begin moving the box upward the direction of arrow 730.

The candidate anchor features of the bookcase 240 may have been previously extracted from image data gathered by the HMD device 18 when the user 200 looked in the area of the bookcase. Accordingly, as the user 200 moves the virtual display box 710 upwardly, and despite the bookcase 240 being outside the field of view 720 of the HMD device 18, a correspondence is identified between the bottom planar face 740 (virtual anchor feature) of the box and the top planar surface 296 (corresponding candidate anchor feature) of the bookcase 240. Based on identifying the correspondence, an indication 750 is generated and located on the top planar surface 296 in the 3D model. To inform the user 200 that the top planar surface 296 is located behind him, an extension 760 of the indication 750 is displayed extending into the field of view 720 of the HMD device from the non-visible location of the top planar surface.

As shown in FIGS. 8 and 9, the user 200 may utilize the displayed extension 760 to position the bottom planar face 740 of the box 710 to be coplanar with the top planar surface 296 of the bookcase 240, even with the bookcase being located behind and out of view of the user.

In some examples a user may preselect a physical object and/or physical feature of an object, as described above, such that the corresponding candidate anchor feature is selected and an indication of the candidate anchor feature is displayed to the user even when the physical object and candidate anchor feature are outside a field of view of the HMD device 18.

With reference to FIGS. 9 and 10, the user 200 may provide user selection input that causes the box 710 to translate, rotate and/or reorient to be located on top of the bookcase 240 such that the bottom planar face 740 of the box appears to rest on the top planar surface 296 of the bookcase (see FIG. 10). In this manner, when the user 200 turns to bring the bookcase into the field of view of the HMD device 18, the user 200 will perceive the box 710 sitting on top of the bookcase 240.

With continued reference to FIG. 10, in some examples the HMD device 18 may output a directional notification when the virtual anchor feature of the virtual object aligns with the corresponding candidate anchor feature of the corresponding physical feature located at the non-visible location. In this manner, the HMD device 18 may alert the user 200 of the non-visible location at which a virtual object has aligned.

In one example and as shown in FIG. 10, when the bottom planar face 740 of the virtual box 710 aligns with the top planar surface 296 of the bookcase 240, directional speakers of the HMD device 18 may broadcast a directional sound "Clink" that the user 200 perceives to originate from behind and above him at approximately the location of the virtual box 710. It will be appreciated that in the example of FIG. 10 the alignment of the virtual box 710 with the top planar surface 296 of the bookcase 240 may be effected in the 3D model of the room 210. In this manner, when the user 200 turns to bring the bookcase into the field of view of the HMD device 18, the box 710 will be displayed to appear sitting on top of the bookcase 240.

It will be appreciated that other types and forms of directional notifications that communicate a 2D or 3D location in the real world physical environment to the user 200 may be utilized. For example, a directional notification may comprise haptic output from a transducer of the HMD device 18, such as one or more vibrations or a pattern of vibrations. In some examples, a location of the haptic feedback on the HMD device 18 may correspond to a location in the real world physical environment of a virtual object aligning with a physical object. In other examples where the user provides input via a hand-held controller, the controller may generate a sound or vibration to signal that the virtual anchor feature of the virtual object has aligned with the corresponding candidate anchor feature of the corresponding physical feature.

When a virtual object is aligned with a physical object, the virtual object may have a virtual anchor feature that is aligned with a corresponding candidate anchor feature of a physical feature of the object. For example and with reference to FIG. 11, the bounding box 286 of holographic tank 284 is displayed as sitting on the table top 236 of table 230, such that a bottom planar face of the cube is aligned with the top planar surface of table top.

Figure 12:
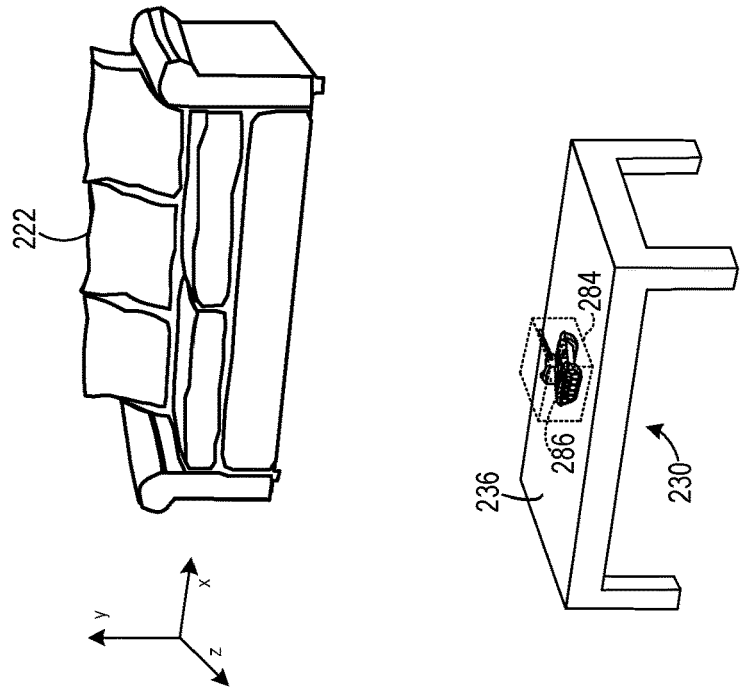
FIGS. 11 and 12 show a virtual object displayed to move with the corresponding physical object to which it is aligned according to an example of the present disclosure.
Figure 11:
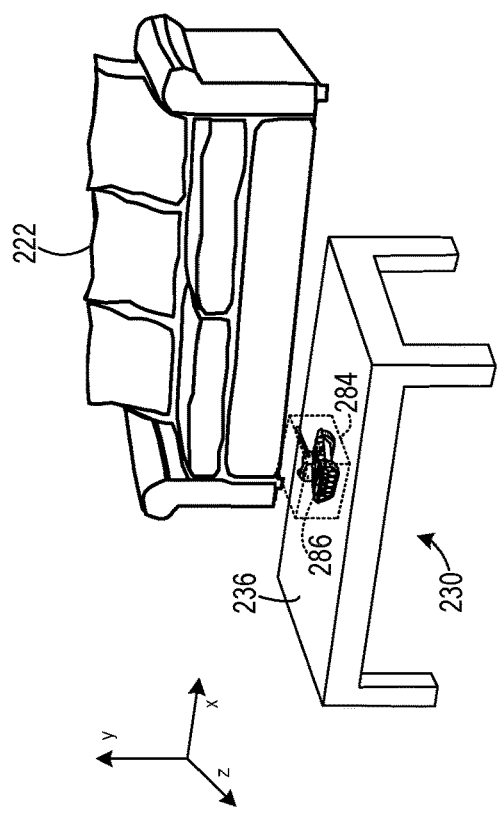
Figure 14:
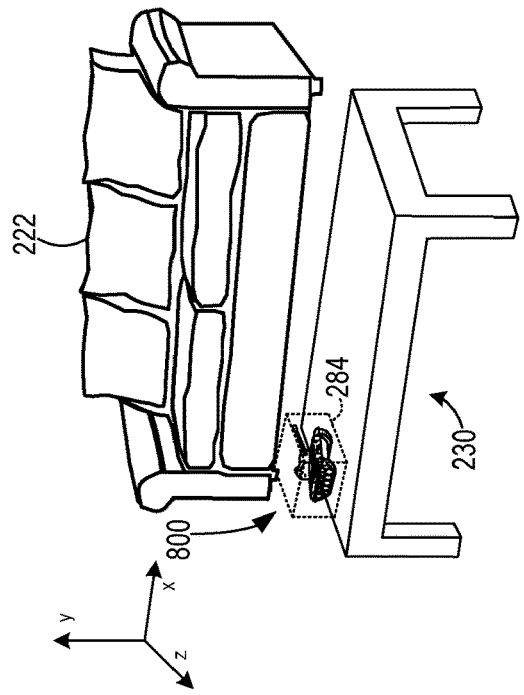
FIGS. 13 and 14 show a virtual object displayed to remain at a virtual object location when the corresponding physical object to which it is aligned moves according to an example of the present disclosure.

As shown in FIG. 12, when the table 230 moves away from the couch 222, a corresponding movement of the bounding box 286 and tank 284 is displayed such that the bottom planar face of the cube (virtual anchor feature) remains aligned with the top planar surface 236 (corresponding candidate anchor feature of the corresponding physical feature). In this manner, the holographic tank 284 may appear to remain on the table top 236 in a natural manner as the table 230 is moved.

Figure 13:
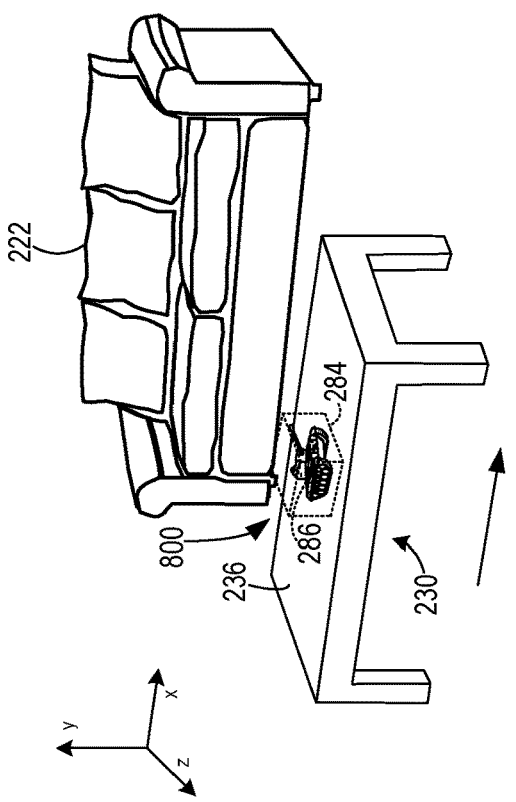

In another example and with reference to FIG. 13, the bounding box 286 and holographic tank 284 may be displayed at a location on the table top 236 that corresponds to a virtual object location 800 in the 3D model of the room 210. In this example, the box 286 and tank 284 may be fixed to this virtual object location 800 in the model. Accordingly and with reference to FIG. 14, when table 230 moves to a new location within the room 210, the box 286 and tank 284 remain displayed at the fixed virtual object location 800.

Figure 15:
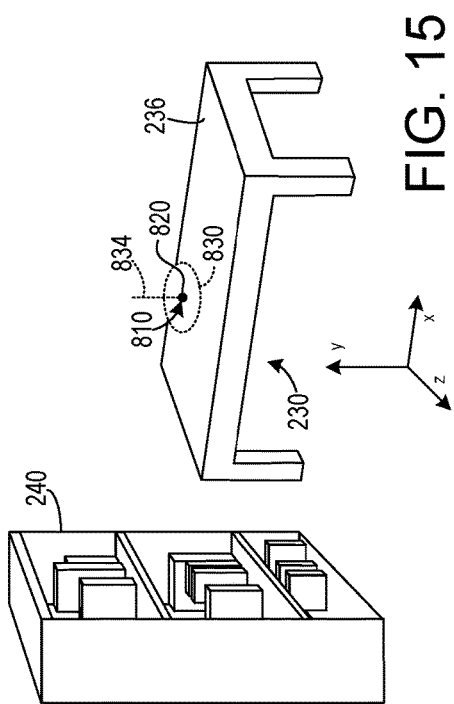

In some examples, a virtual object may be created with assistance from one or more techniques disclosed here. With reference now to FIG. 15, the user 200 (not shown) may gaze at a point on table top 236, with the gaze detection system of the HMD device 18 determining the intersection point 810 of the user's gaze direction with the plane of the table top. In this example a cursor 820 is displayed at gaze intersection point 810, with the cursor being controlled by the user via user input, such as gaze direction. The detected planar surface of table top 236 may be indicated by a virtual circular region 830 and a surface normal 834.

Figure 16:
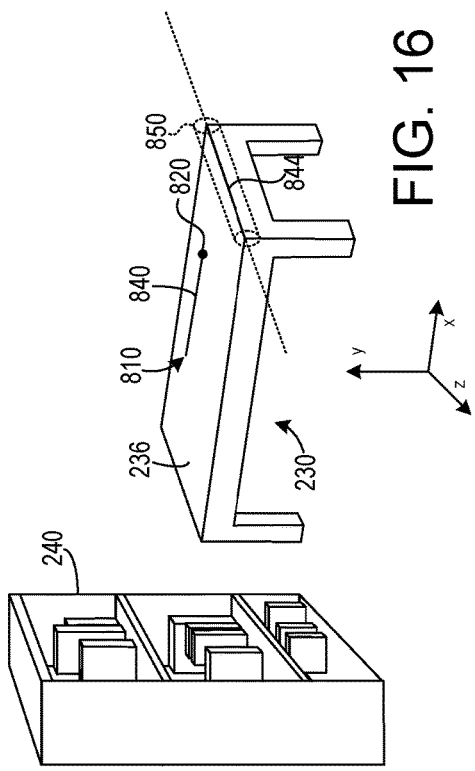
FIGS. 15-19 show the creation of a virtual box utilizing indications of corresponding candidate anchor features at corresponding physical features within the physical environment according to an example of the present disclosure.

With reference to FIG. 16, the user may provide user drawing input, such as via a voice command, that enables the user to draw a three dimensional edge 840 on the plane of the table top 306 starting at the intersection point 810. The edge's end point, indicated by cursor 820, may be controlled by the user's gaze direction, and the edge 840 may align to nearby physical linear edges. Such alignment may take the form of making the endpoint of the edge 840 extend to a nearby physical linear edge, such as right table edge 844. Such alignment may also take the form of orienting the edge 840 to be parallel to or perpendicular to a physical linear edge. As shown in FIG. 16, in this example an indication 850 of the right table edge 844 (a corresponding candidate anchor feature) may be displayed as described above.

Figure 17:
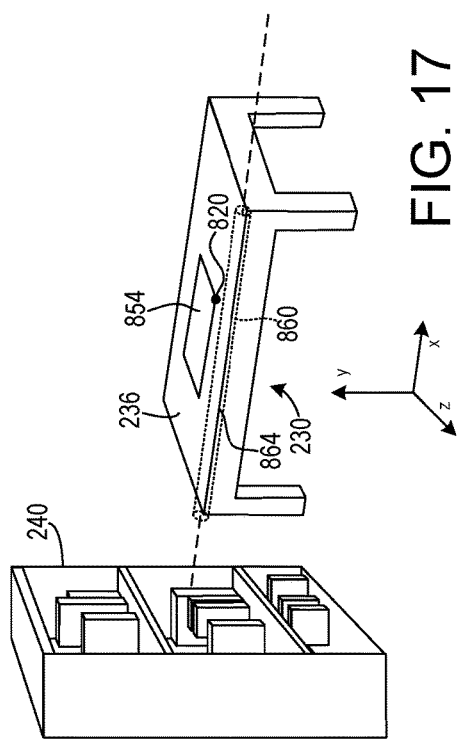
Figure 19:
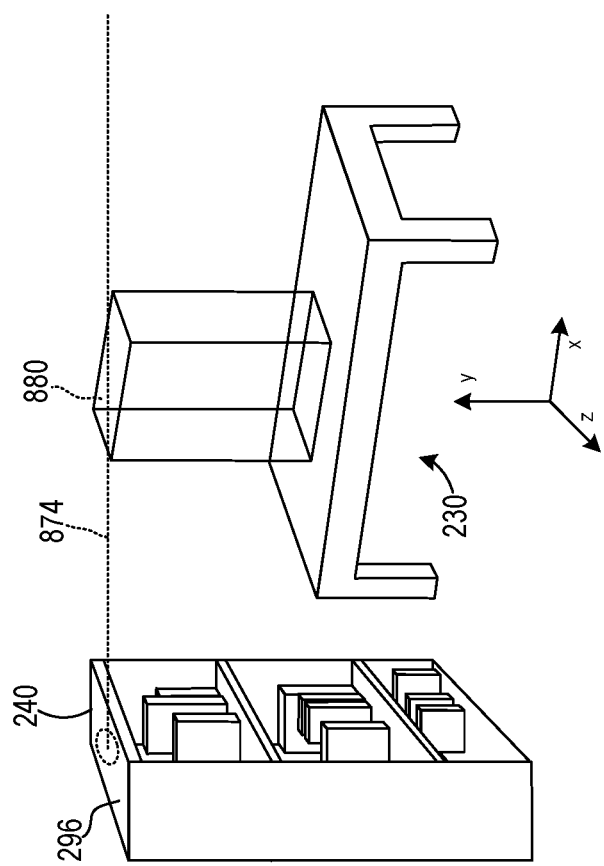

With reference now to FIG. 17, the user may provide further user input that fixes the end point of the edge 840 and, by moving his gaze direction, may begin extending a rectangular area 854 away from the fixed edge. The user may determine the size of the rectangular area 854 by providing further user input that fixes the size of the area. As shown in FIG. 17, in this example an indication 860 of the near table edge 864 (a corresponding candidate anchor feature) may be displayed as described above.

Figure 18:
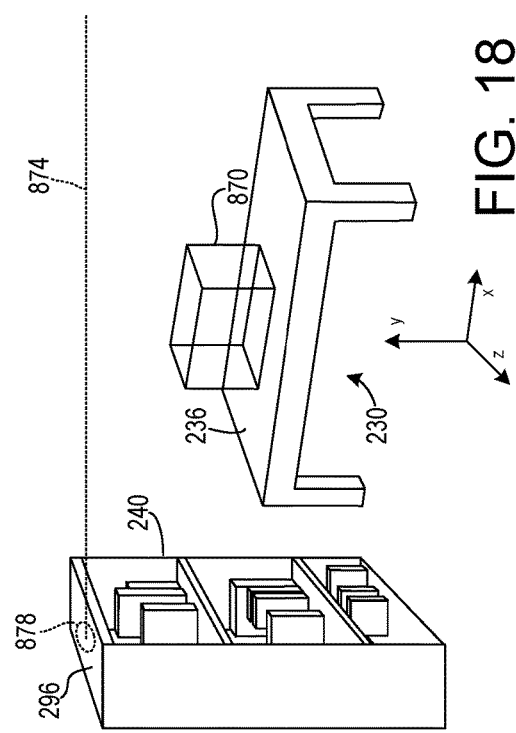

With reference now to FIG. 18, a three dimensional box 870 may be extruded upwardly away from the table top 236. In some examples, the height of the three dimensional box may be determined by finding the closest intersection between the user's head direction and a ray cast from the HMD device in the direction of the three dimensional box extrusion starting from the box's center. The height of the box 870 also may align with physical planar surfaces and/or to nearby edge endpoints. In the example of FIG. 18, an extension 874 of an indication 878 corresponding to the top planar surface 296 of bookcase 240 may be displayed in response to the upward extrusion of the three dimensional box 870. In this manner and with reference to FIG. 19, the user may easily align a top planar surface 880 of the box 870 with the top planar surface 296 of the bookcase 240 such that the surfaces are coplanar.

Figure 20B:
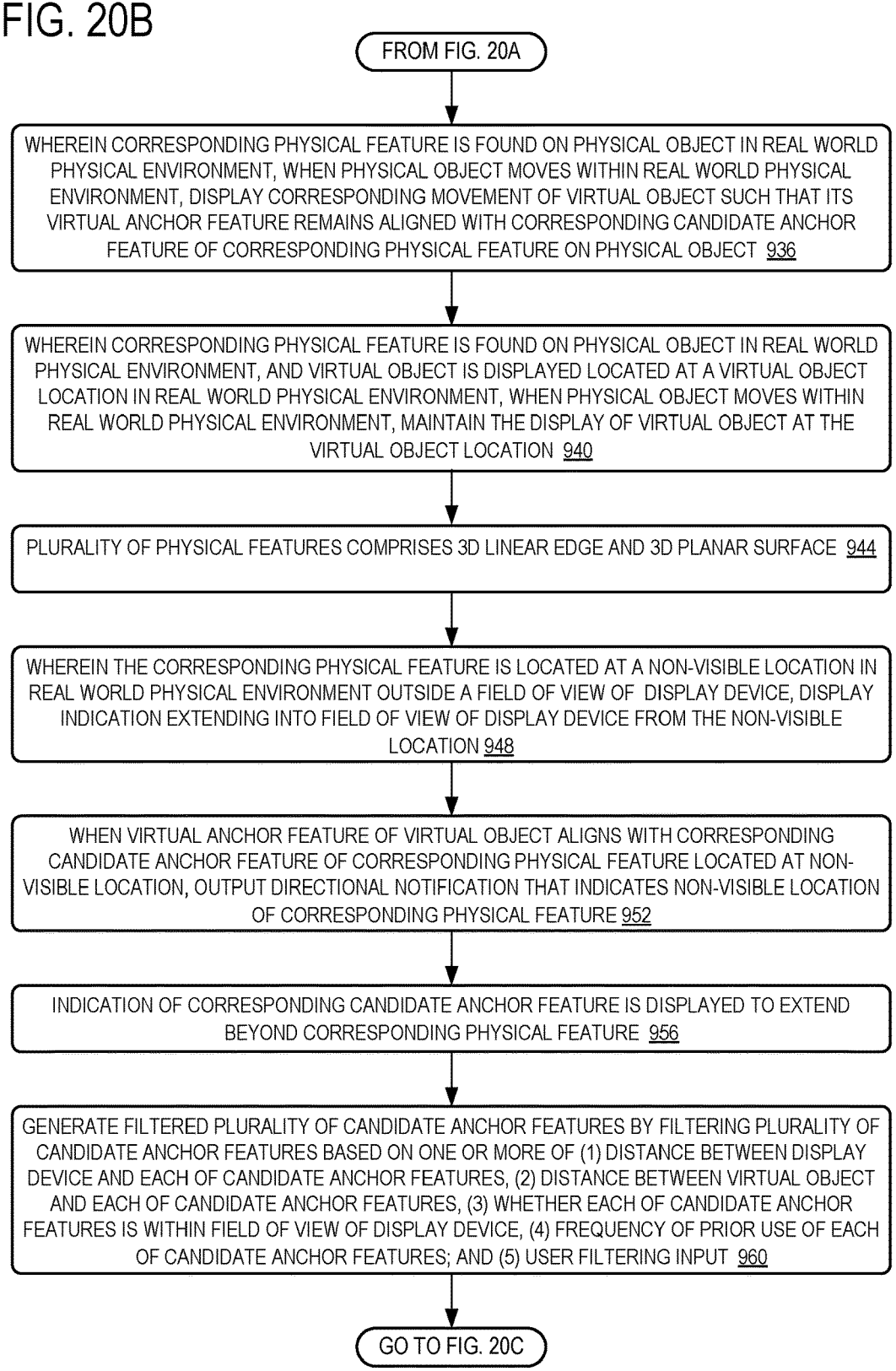

FIGS. 20A, 20B and 20C illustrate a flow chart of a method 900 for manipulating a virtual object displayed via a display device according to an example of the present disclosure. The following description of method 900 is provided with reference to the software and hardware components described above and shown in FIGS. 1-19. It will be appreciated that method 900 also may be performed in other contexts using other suitable hardware and software components.

With reference to FIG. 20A, at 904 the method 900 may include receiving image data of a real world physical environment comprising a plurality of physical features. At 908 the method 900 may include, using the image data, generating a three dimensional model of at least a portion of the real world physical environment. At 912 the method 900 may include extracting from the image data a plurality of candidate anchor features that each correspond to one of the physical features in the real world physical environment. At 916 the method 900 may include receiving user manipulation input that manipulates the virtual object as displayed within the real world physical environment, wherein the virtual object comprises a virtual anchor feature.

At 920 the method 900 may include, based on the manipulation of the virtual object, identifying at least one correspondence between the virtual anchor feature of the virtual object and a corresponding candidate anchor feature from the plurality of candidate anchor features. At 924 the method 900 may include, based on identifying the at least one correspondence, displaying via the display device an indication of the corresponding candidate anchor feature at its corresponding physical feature within the real world physical environment. At 928 the method 900 may include, based on receiving a user selection input, aligning the virtual anchor feature of the virtual object with the corresponding candidate anchor feature of the corresponding physical feature. At 932 the method 900 may include displaying the virtual object with its virtual anchor feature aligned with the corresponding candidate anchor feature.

With reference now to FIG. 20B, at 936 the method 900 may include, wherein the corresponding physical feature is found on a physical object in the real world physical environment, the method further comprising, when the physical object moves within the real world physical environment, displaying a corresponding movement of the virtual object such that its virtual anchor feature remains aligned with the corresponding candidate anchor feature of the corresponding physical feature on the physical object. At 940 the method 900 may include, wherein the corresponding physical feature is found on a physical object in the real world physical environment, and the virtual object is displayed located at a virtual object location in the real world physical environment, the method further comprising, when the physical object moves within the real world physical environment, maintaining the display of the virtual object at the virtual object location.

At 944 the method 900 may include wherein the plurality of physical features comprises a three dimensional linear edge and a three dimensional planar surface. At 948 the method 900 may include, wherein the corresponding physical feature is located at a non-visible location in the real world physical environment that is outside a field of view of the display device, displaying the indication extending into the field of view of the display device from the non-visible location. At 952 the method 900 may include, when the virtual anchor feature of the virtual object aligns with the corresponding candidate anchor feature of the corresponding physical feature located at the non-visible location, outputting a directional notification that indicates the non-visible location of the corresponding physical feature.

At 956 the method 900 may include wherein the indication of the corresponding candidate anchor feature is displayed to extend beyond the corresponding physical feature. At 960 the method 900 may include generating a filtered plurality of candidate anchor features by filtering the plurality of candidate anchor features based on one or more of (1) a distance between the display device and each of the candidate anchor features, (2) a distance between the virtual object and each of the candidate anchor features, (3) whether each of the candidate anchor features is within a field of view of the display device, (4) a frequency of prior use of each of the candidate anchor features; and (5) user filtering input.

With reference now to FIG. 20C, at 964 the method 900 may include wherein identifying the at least one correspondence further comprises identifying the at least one correspondence from the filtered plurality of candidate anchor features. At 968 the method 900 may include receiving a user preselection input of a selected physical feature from the plurality of physical features, wherein the selected physical feature comprises the corresponding physical feature of the corresponding candidate anchor feature, and wherein identifying the at least one correspondence is also based on the user preselection input of the selected physical feature. At 972 the method 900 may include, wherein the corresponding candidate anchor feature is located at an initial three dimensional location in the three dimensional model and is extracted from a frame of the image data received at an initial time, determining that the corresponding candidate anchor feature is not present in subsequent frames of the image data received after the initial time, and maintaining the corresponding candidate anchor feature at the initial three dimensional location in the three dimensional model until expiration of a predetermined period of time after the initial time.

It will be appreciated that method 900 is provided by way of example and is not meant to be limiting. Therefore, it is to be understood that method 900 may include additional and/or alternative steps relative to those illustrated in FIGS. 20A, 20B, and 20C. Further, it is to be understood that method 900 may be performed in any suitable order. Further still, it is to be understood that one or more steps may be omitted from method 900 without departing from the scope of this disclosure.

In some embodiments, the methods and processes described herein may be tied to a computing system of one or more computing devices. In particular, such methods and processes may be implemented as a computer-application program or service, an application-programming interface (API), a library, and/or other computer-program product.

Figure 21:
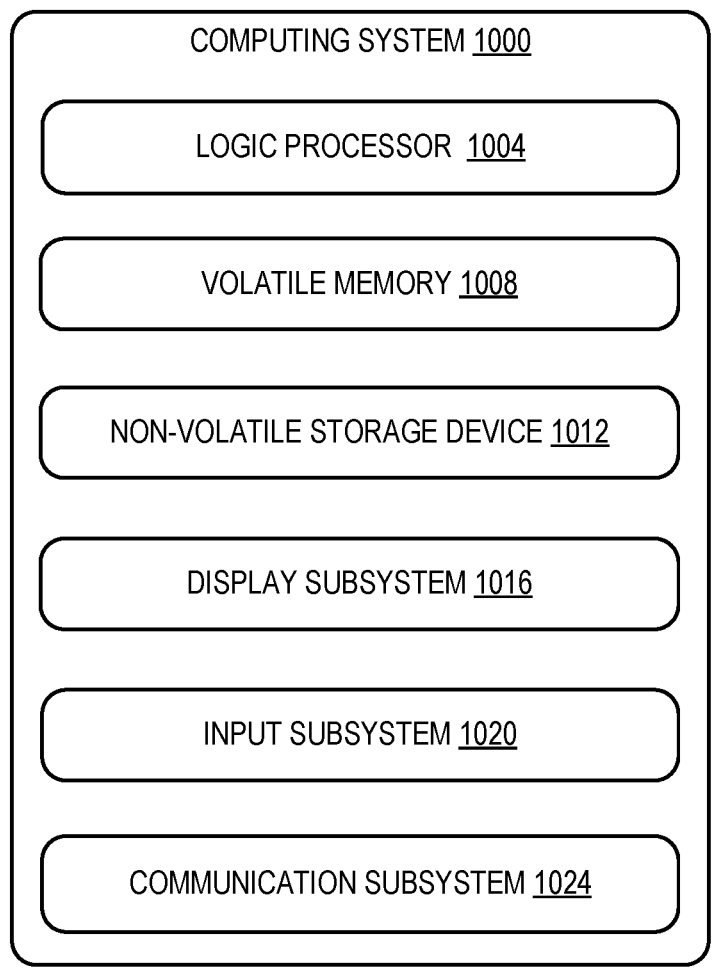
FIG. 21 shows a computing system according to an embodiment of the present disclosure.

FIG. 21 schematically shows a non-limiting embodiment of a computing system 1000 that can enact one or more of the methods and processes described above. Computing device 10 and computing device 80 shown in FIG. 1 may take the form of or include one or more aspects of computing system 1000. Computing system 1000 is shown in simplified form. It is to be understood that virtually any computer architecture may be used without departing from the scope of this disclosure. In different examples, computing system 1000 may take the form of or be communicatively coupled with a head-mounted display device, tablet computer, home entertainment computer, desktop computer, network computing device, tablet, notebook, smartphone, gaming device, other mobile computing device, etc.

Computing system 1000 includes a logic processor 1004, volatile memory 1008, and a non-volatile storage device 1012. Computing system 1000 may optionally include a display subsystem 1016, input subsystem 1020, communication subsystem 1024, and/or other components not shown in FIG. 21.

Logic processor 1004 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1004 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 1008 may include physical devices that include random access memory. Volatile memory 1008 is typically utilized by logic processor 1004 to temporarily store information during processing of software instructions. It will be appreciated that volatile memory 1008 typically does not continue to store instructions when power is cut to the volatile memory 1008.

Non-volatile storage device 1012 includes one or more physical devices configured to hold instructions executable by the logic processors to implement the methods and processes described herein. When such methods and processes are implemented, the state of non-volatile storage device 1012 may be transformed—e.g., to hold different data.

Non-volatile storage device 1012 may include physical devices that are removable and/or built-in. Non-volatile storage device 1012 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1012 may include nonvolatile, dynamic, static, read/write, read-only, sequential-access, location-addressable, file-addressable, and/or content-addressable devices. It will be appreciated that non-volatile storage device 1012 is configured to hold instructions even when power is cut to the non-volatile storage device 1012.

Aspects of logic processor 1004, volatile memory 1008, and non-volatile storage device 1012 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 1000 implemented to perform a particular function. In some cases, a program may be instantiated via logic processor 1004 executing instructions held by non-volatile storage device 1012, using portions of volatile memory 1008. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 1016 may be used to present a visual representation of data held by non-volatile storage device 1012. As the herein described methods and processes change the data held by the non-volatile storage device, and thus transform the state of the non-volatile storage device, the state of display subsystem 1016 may likewise be transformed to visually represent changes in the underlying data. Display subsystem 1016 may include one or more display devices utilizing virtually any type of technology. Such display devices may be combined with logic processor 1004, volatile memory 1008, and/or non-volatile storage device 1012 in a shared enclosure, or such display devices may be peripheral display devices. With respect to the example HMD device 18 of FIG. 1, the see-through display 36 configured to visually augment an appearance of a real-world three dimensional physical environment by displaying virtual objects such as holograms is an example of a display subsystem 1016.

When included, input subsystem 1020 may comprise or interface with one or more user-input devices. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, inertial measurement unit, and/or gyroscope for motion detection, gaze detection, and/or intent recognition, electric-field sensing componentry for assessing brain activity, any of the sensors described above with respect to HMD device 18, and/or any other suitable sensor.

When included, communication subsystem 1024 may be configured to communicatively couple computing system 1000 with one or more other computing devices. Communication subsystem 1024 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

The following paragraphs provide additional support for the claims of the subject application. One aspect provides a method for manipulating a virtual object displayed via a display device, the method comprising: receiving image data of a real world physical environment comprising a plurality of physical features; using the image data, generating a three dimensional model of at least a portion of the real world physical environment; extracting from the image data a plurality of candidate anchor features that each correspond to one of the physical features in the real world physical environment; receiving user manipulation input that manipulates the virtual object as displayed within the real world physical environment, wherein the virtual object comprises a virtual anchor feature; based on the manipulation of the virtual object, identifying at least one correspondence between the virtual anchor feature of the virtual object and a corresponding candidate anchor feature from the plurality of candidate anchor features; and based on identifying the at least one correspondence, displaying via the display device an indication of the corresponding candidate anchor feature at its corresponding physical feature within the real world physical environment. The method may additionally or optionally include, based on receiving a user selection input, aligning the virtual anchor feature of the virtual object with the corresponding candidate anchor feature of the corresponding physical feature; and displaying the virtual object with its virtual anchor feature aligned with the corresponding candidate anchor feature. The method may additionally or optionally include, wherein the corresponding physical feature is found on a physical object in the real world physical environment, when the physical object moves within the real world physical environment, displaying a corresponding movement of the virtual object such that its virtual anchor feature remains aligned with the corresponding candidate anchor feature of the corresponding physical feature on the physical object. The method may additionally or optionally include, wherein the corresponding physical feature is found on a physical object in the real world physical environment, and the virtual object is displayed located at a virtual object location in the real world physical environment, when the physical object moves within the real world physical environment, maintaining the display of the virtual object at the virtual object location. The method may additionally or optionally include, wherein the plurality of physical features comprises a three dimensional linear edge and a three dimensional planar surface. The method may additionally or optionally include, wherein the corresponding physical feature is located at a non-visible location in the real world physical environment that is outside a field of view of the display device, displaying the indication extending into the field of view of the display device from the non-visible location. The method may additionally or optionally include, when the virtual anchor feature of the virtual object aligns with the corresponding candidate anchor feature of the corresponding physical feature located at the non-visible location, outputting a directional notification that indicates the non-visible location of the corresponding physical feature. The method may additionally or optionally include, wherein the indication of the corresponding candidate anchor feature is displayed to extend beyond the corresponding physical feature. The method may additionally or optionally include, generating a filtered plurality of candidate anchor features by filtering the plurality of candidate anchor features based on one or more of (1) a distance between the display device and each of the candidate anchor features, (2) a distance between the virtual object and each of the candidate anchor features, (3) whether each of the candidate anchor features is within a field of view of the display device, (4) a frequency of prior use of each of the candidate anchor features, and (5) user filtering input. The method may additionally or optionally include, wherein identifying the at least one correspondence further comprises identifying the at least one correspondence from the filtered plurality of candidate anchor features. The method may additionally or optionally include, receiving a user preselection input of a selected physical feature from the plurality of physical features, wherein the selected physical feature comprises the corresponding physical feature of the corresponding candidate anchor feature, and wherein identifying the at least one correspondence is also based on the user preselection input of the selected physical feature. The method may additionally or optionally include, wherein the corresponding candidate anchor feature is located at an initial three dimensional location in the three dimensional model, and is extracted from a frame of the image data received at an initial time: determining that the corresponding candidate anchor feature is not present in subsequent frames of the image data received after the initial time; and maintaining the corresponding candidate anchor feature at the initial three dimensional location in the three dimensional model until expiration of a predetermined period of time after the initial time.

Another aspect provides a computing device for manipulating a virtual object displayed via a display device, the computing device comprising: a processor; and a memory holding instructions executable by the processor to: receive image data of a real world physical environment comprising a plurality of physical features; using the image data, generate a three dimensional model of at least a portion of the real world physical environment; extract from the image data a plurality of candidate anchor features that each correspond to one of the physical features in the real world physical environment; receive user manipulation input that manipulates the virtual object as displayed within the real world physical environment, wherein the virtual object comprises a virtual anchor feature; based on the manipulation of the virtual object, identify at least one correspondence between the virtual anchor feature of the virtual object and a corresponding candidate anchor feature from the plurality of candidate anchor features; and based on identifying the at least one correspondence, display via the display device an indication of the corresponding candidate anchor feature at its corresponding physical feature within the real world physical environment. The computing device may additionally or alternatively include, wherein the instructions are executable by the processor to: based on receiving a user selection input, align the virtual anchor feature of the virtual object with the corresponding candidate anchor feature of the corresponding physical feature; and display via the display device the virtual object with its virtual anchor feature aligned with the corresponding candidate anchor feature. The computing device may additionally or alternatively include, wherein the corresponding physical feature is found on a physical object in the real world physical environment, and the instructions are executable by the processor to, when the physical object moves within the real world physical environment, display via the display device a corresponding movement of the virtual object such that its virtual anchor feature remains aligned with the corresponding candidate anchor feature of the corresponding physical feature on the physical object. The computing device may additionally or alternatively include, wherein the corresponding physical feature is found on a physical object in the real world physical environment, and the virtual object is displayed via the display device located at a virtual object location in the real world physical environment, and the instructions are executable by the processor to, when the physical object moves within the real world physical environment, maintain the display of the virtual object at the virtual object location. The computing device may additionally or alternatively include, wherein the corresponding physical feature is located at a non-visible location in the real world physical environment that is outside a field of view of the display device, and the instructions are executable by the processor to display via the display device the indication extending into the field of view of the display device from the non-visible location. The computing device may additionally or alternatively include, wherein the instructions are executable by the processor to, when the virtual anchor feature of the virtual object aligns with the corresponding candidate anchor feature of the corresponding physical feature located at the non-visible location, output a directional notification that indicates the non-visible location of the corresponding physical feature. The computing device may additionally or alternatively include, wherein to identify the at least one correspondence further comprises to identify the at least one correspondence from a filtered plurality of candidate anchor features that are generated based on one or more of (1) a distance between the display device and each of the candidate anchor features, (2) a distance between the virtual object and each of the candidate anchor features, (3) whether each of the candidate anchor features is within a field of view of the display device, (4) a frequency of prior use of each of the candidate anchor features, and (5) user filtering input.

Another aspect provides head-mounted display device, comprising: an at least partially see-through display; a processor; and a memory holding instructions executable by the processor to: display a virtual object via the at least partially see-through display; receive image data of a real world physical environment comprising a plurality of physical features; using the image data, generate a three dimensional model of at least a portion of the real world physical environment; extract from the image data a plurality of candidate anchor features that each correspond to one of the physical features in the real world physical environment; receive user manipulation input that manipulates the virtual object as displayed within the real world physical environment, wherein the virtual object comprises a virtual anchor feature; based on the manipulation of the virtual object, identify at least one correspondence between the virtual anchor feature of the virtual object and a corresponding candidate anchor feature from the plurality of candidate anchor features; based on identifying the at least one correspondence, display via the at least partially see-through display an indication of the corresponding candidate anchor feature at its corresponding physical feature within the real world physical environment; based on receiving a user selection input, align the virtual anchor feature of the virtual object with the corresponding candidate anchor feature of the corresponding physical feature; and display the virtual object with its virtual anchor feature aligned with the corresponding candidate anchor feature.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for manipulating a virtual object displayed via a display device, the method comprising:

receiving image data of a real world physical environment comprising a plurality of physical features;

using the image data, generating a three dimensional model of at least a portion of the real world physical environment;

extracting from the image data a plurality of candidate anchor features that each correspond to one of the physical features in the real world physical environment;

receiving user manipulation input that manipulates the virtual object as displayed within the real world physical environment, wherein the virtual object comprises a virtual anchor feature;

based on the manipulation of the virtual object, identifying at least one correspondence between the virtual anchor feature of the virtual object and a corresponding candidate anchor feature from the plurality of candidate anchor features, wherein the corresponding candidate anchor feature is located at an initial three dimensional location in the three dimensional model, and is extracted from a frame of the image data received at an initial time;

based on identifying the at least one correspondence, displaying via the display device an indication of the corresponding candidate anchor feature at its corresponding physical feature within the real world physical environment;

determining that the corresponding candidate anchor feature is not present in subsequent frames of the image data received after the initial time; and maintaining the corresponding candidate anchor feature at the initial three dimensional location in the three dimensional model until expiration of a predetermined period of time after the initial time.

2. The method of claim 1, further comprising:

based on receiving a user selection input, aligning the virtual anchor feature of the virtual object with the corresponding candidate anchor feature of the corresponding physical feature; and displaying the virtual object with its virtual anchor feature aligned with the corresponding candidate anchor feature.

3. The method of claim 2, wherein the corresponding physical feature is found on a physical object in the real world physical environment, the method further comprising, when the physical object moves within the real world physical environment, displaying a corresponding movement of the virtual object such that its virtual anchor feature remains aligned with the corresponding candidate anchor feature of the corresponding physical feature on the physical object.

4. The method of claim 2, wherein the corresponding physical feature is found on a physical object in the real world physical environment, and the virtual object is displayed located at a virtual object location in the real world physical environment, the method further comprising, when the physical object moves within the real world physical environment, maintaining the display of the virtual object at the virtual object location.

5. The method of claim 1, wherein the plurality of physical features comprises a three dimensional linear edge and a three dimensional planar surface.

6. The method of claim 1, wherein the corresponding physical feature is located at a non-visible location in the real world physical environment that is outside a field of view of the display device, the method further comprising displaying the indication extending into the field of view of the display device from the non-visible location.

7. The method of claim 6, further comprising, when the virtual anchor feature of the virtual object aligns with the corresponding candidate anchor feature of the corresponding physical feature located at the non-visible location, outputting a directional notification that indicates the non-visible location of the corresponding physical feature.

8. The method of claim 1, wherein the indication of the corresponding candidate anchor feature is displayed to extend beyond the corresponding physical feature.

9. The method of claim 1, further comprising generating a filtered plurality of candidate anchor features by filtering the plurality of candidate anchor features based on one or more of (1) a distance between the display device and each of the candidate anchor features, (2) a distance between the virtual object and each of the candidate anchor features, (3) whether each of the candidate anchor features is within a field of view of the display device, (4) a frequency of prior use of each of the candidate anchor features, and (5) user filtering input.

10. The method of claim 9, wherein identifying the at least one correspondence further comprises identifying the at least one correspondence from the filtered plurality of candidate anchor features.

11. The method of claim 1, further comprising receiving a user preselection input of a selected physical feature from the plurality of physical features, wherein the selected physical feature comprises the corresponding physical feature of the corresponding candidate anchor feature, and wherein identifying the at least one correspondence is also based on the user preselection input of the selected physical feature.

12. A computing device for manipulating a virtual object displayed via a display device, the computing device comprising:
a processor; and
a memory holding instructions executable by the processor to:
receive image data of a real world physical environment comprising a plurality of physical features;
using the image data, generate a three dimensional model of at least a portion of the real world physical environment;
extract from the image data a plurality of candidate anchor features that each correspond to one of the physical features in the real world physical environment, wherein at least one of the corresponding physical feature is located at a non-visible location in the real world physical environment that is outside a field of view of the display device;
receive user manipulation input that manipulates the virtual object as displayed within the real world physical environment, wherein the virtual object comprises a virtual anchor feature;
based on the manipulation of the virtual object, identify at least one correspondence between the virtual anchor feature of the virtual object and a corresponding candidate anchor feature from the plurality of candidate anchor features, wherein the corresponding candidate anchor feature corresponds to the at least one corresponding physical feature that is located at the non-visible location;
based on identifying the at least one correspondence, display via the display device an indication of the corresponding candidate anchor feature at its corresponding physical feature within the real world physical environment, wherein the indication extends into the field of view of the display device from the non-visible location; and
when the virtual anchor feature of the virtual object aligns with the corresponding candidate anchor feature of the corresponding physical feature located at the non-visible location, output a directional notification that indicates the non-visible location of the corresponding physical feature.

13. The computing device of claim 12, wherein the instructions are executable by the processor to:
based on receiving a user selection input, align the virtual anchor feature of the virtual object with the corresponding candidate anchor feature of the corresponding physical feature; and
display via the display device the virtual object with its virtual anchor feature aligned with the corresponding candidate anchor feature.

14. The computing device of claim 13, wherein the corresponding physical feature is found on a physical object in the real world physical environment, and the instructions are executable by the processor to, when the physical object moves within the real world physical environment, display via the display device a corresponding movement of the virtual object such that its virtual anchor feature remains aligned with the corresponding candidate anchor feature of the corresponding physical feature on the physical object.

15. The computing device of claim 13, wherein the corresponding physical feature is found on a physical object in the real world physical environment, and the virtual object is displayed via the display device located at a virtual object location in the real world physical environment, and the instructions are executable by the processor to, when the physical object moves within the real world physical environment, maintain the display of the virtual object at the virtual object location.

16. The computing device of claim 12, wherein to identify the at least one correspondence further comprises to identify the at least one correspondence from a filtered plurality of candidate anchor features that are generated based on one or more of (1) a distance between the display device and each of the candidate anchor features, (2) a distance between the virtual object and each of the candidate anchor features, (3) whether each of the candidate anchor features is within a field of view of the display device, (4) a frequency of prior use of each of the candidate anchor features, and (5) user filtering input.

17. A head-mounted display device, comprising:
an at least partially see-through display;
a processor; and
a memory holding instructions executable by the processor to:
    display a virtual object via the at least partially see-through display;
    receive image data of a real world physical environment comprising a plurality of physical features;
    using the image data, generate a three dimensional model of at least a portion of the real world physical environment;
    extract from the image data a plurality of candidate anchor features that each correspond to one of the physical features in the real world physical environment;
    receive user manipulation input that manipulates the virtual object as displayed within the real world physical environment, wherein the virtual object comprises a virtual anchor feature;
    based on the manipulation of the virtual object, identify at least one correspondence between the virtual anchor feature of the virtual object and a corresponding candidate anchor feature from the plurality of candidate anchor features, wherein the corresponding candidate anchor feature is located at an initial three dimensional location in the three dimensional model, and is extracted from a frame of the image data received at an initial time;
    based on identifying the at least one correspondence between the virtual anchor feature and the corresponding candidate anchor feature, display via the at least partially see-through display an indication of the corresponding candidate anchor feature at its corresponding physical feature within the real world physical environment;
    determine that the corresponding candidate anchor feature is not present in subsequent frames of the image data received after the initial time; and
    maintain the corresponding candidate anchor feature at the initial three dimensional location in the three dimensional model until expiration of a predetermined period of time after the initial time.

* * * * *